(12) United States Patent
Avramovich et al.

(10) Patent No.: US 11,566,934 B2
(45) Date of Patent: Jan. 31, 2023

(54) WEIGHT SCALES SYSTEMS AND METHODS

(71) Applicant: ScaleThings Sp.z.o.o., Warsaw (PL)

(72) Inventors: Eyal Avramovich, Hod Hasharon (IL); Ronny Barak, Tel Aviv (IL)

(73) Assignee: ScaleThings Sp.z.o.o., Warsaw (PL)

( * ) Notice: Subject to any disclaimer, the term of this patent is extended or adjusted under 35 U.S.C. 154(b) by 0 days.

(21) Appl. No.: 17/848,347

(22) Filed: Jun. 23, 2022

(65) Prior Publication Data

US 2022/0326066 A1  Oct. 13, 2022

Related U.S. Application Data

(63) Continuation of application No. 16/472,003, filed as application No. PCT/IL2017/051365 on Dec. 20, 2017, now abandoned.

(Continued)

(51) Int. Cl.
*G01G 19/44* (2006.01)
*G01G 19/52* (2006.01)
(Continued)

(52) U.S. Cl.
CPC .......... *G01G 19/445* (2013.01); *A61G 7/015* (2013.01); *A61G 7/0527* (2016.11); *G01G 5/006* (2013.01);
(Continued)

(58) Field of Classification Search
CPC ........ G01G 19/445; G01G 5/006; G01G 5/04; G01G 19/52; G01G 23/01; A61G 7/0527; A61G 7/015
See application file for complete search history.

(56) References Cited

U.S. PATENT DOCUMENTS 3,217,818 A  11/1965  Engelsher et al.
3,745,788 A   7/1973  Sullivan
(Continued)

FOREIGN PATENT DOCUMENTS

EP  0482267 B1  7/1994
EP  2995242 A1  3/2016
(Continued)

OTHER PUBLICATIONS

International Search Report and Written Opinion for PCT/IL2017/051365 dated Apr. 12, 2018.
(Continued)

*Primary Examiner* — Randy W Gibson
(74) *Attorney, Agent, or Firm* — Merchant & Gould P.C.

(57) ABSTRACT

A weight scale system is for measuring the weight of an object, which includes a bed section, a vertical separator actuator and a controller. The bed section includes a lower-platform, an upper-platform and weight sensor assemblies located on the lower-platform, each includes at least one weight sensor. The bed section further includes at least one vertical-separator. The vertical-separator actuator is coupled with the vertical-separator and with the controller. The controller is coupled with the weight sensors. The controller directs the vertical-separator actuator to operate the bed section in at least two modes, a referencing mode in which the vertical-separator detaches the upper-platform from the weight sensor assemblies, thereby enabling referencing the weight sensors, and a weighing mode, in which the vertical separator re-attaches the upper-platform with the weight sensor assemblies, such that the weight associated with the upper-platform is fully applied on the weight sensors.

13 Claims, 27 Drawing Sheets

Related U.S. Application Data

(60) Provisional application No. 62/607,346, filed on Dec. 19, 2017, provisional application No. 62/436,996, filed on Dec. 20, 2016.

(51) Int. Cl.
  *G01G 23/01* (2006.01)
  *A61G 7/05* (2006.01)
  *G01G 5/04* (2006.01)
  *A61G 7/015* (2006.01)
  *G01G 5/00* (2006.01)

(52) U.S. Cl.
  CPC .............. *G01G 5/04* (2013.01); *G01G 19/52* (2013.01); *G01G 23/01* (2013.01)

(56) References Cited

U.S. PATENT DOCUMENTS

| | | | |
|---|---|---|---|
| 4,363,368 A | 12/1982 | Paddon et al. | |
| 4,489,799 A | 12/1984 | Menon | |
| 5,393,938 A | 2/1995 | Bumbalough | |
| 5,780,781 A * | 7/1998 | Berger | G01G 19/445 177/144 |
| 5,861,582 A | 1/1999 | Flanagan et al. | |
| 5,906,016 A | 5/1999 | Ferrand et al. | |
| 6,765,154 B2 | 7/2004 | Sternberg | |
| 6,956,175 B1 | 10/2005 | Daly et al. | |
| 7,253,366 B2 | 8/2007 | Bhai | |
| 7,282,654 B2 | 10/2007 | Salgo et al. | |
| 7,437,787 B2 | 10/2008 | Bhai | |
| 7,472,439 B2 | 1/2009 | Lemire et al. | |
| 7,802,071 B2 | 9/2010 | Oved | |
| 7,962,981 B2 | 6/2011 | Lemire et al. | |
| 3,048,005 A1 | 11/2011 | Dixon et al. | |
| 9,295,600 B2 | 3/2016 | Receveur | |
| 9,320,444 B2 | 4/2016 | Hayes et al. | |
| 9,383,250 B2 | 7/2016 | Receveur et al. | |
| 9,754,476 B2 | 9/2017 | Lemire et al. | |
| 2003/0051292 A1 | 3/2003 | Ferrand et al. | |
| 2005/0090721 A1 | 4/2005 | Pirzada | |
| 2009/0178199 A1 | 7/2009 | Brauers et al. | |
| 2009/0252300 A1 | 10/2009 | Schwartz et al. | |
| 2010/0293712 A1 | 11/2010 | Pizzi Spadoni | |
| 2017/0003159 A1 | 1/2017 | Kostic et al. | |
| 2017/0143566 A1 | 5/2017 | Elku et al. | |
| 2017/0326010 A1 | 11/2017 | Lemire et al. | |

FOREIGN PATENT DOCUMENTS

| | | |
|---|---|---|
| EP | 2286782 B1 | 1/2017 |
| GB | 2453371 B | 6/2010 |
| WO | 90/02927 A1 | 3/1990 |
| WO | 03/079953 A2 | 10/2003 |

OTHER PUBLICATIONS

Search Report for European Patent Application No. 17882655.8 dated Jul. 28, 2020.

Communication pursuant to Article 94(3) EPC for European Patent Application No. 17882655.8 (dated Jan. 27, 2021).

Decision to grant a European patent pursuant to Article 97(1) EPC (Mar. 11, 2022).

* cited by examiner

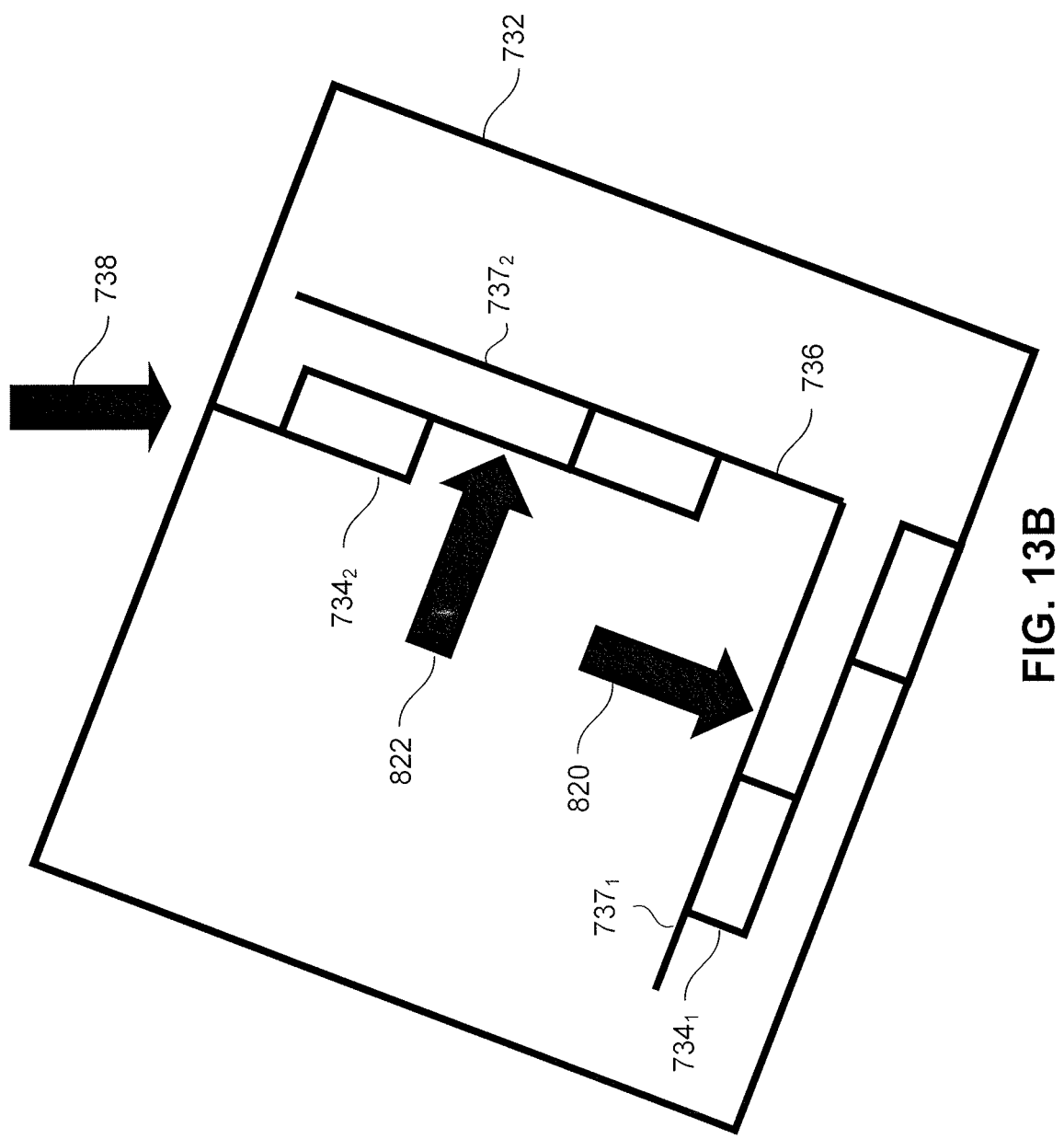

WEIGHT SCALES SYSTEMS AND METHODS

This application is a Continuation of U.S. patent application Ser. No. 16/472,003, filed Jun. 20, 2019, which is a National Stage application of PCT/IL2017/051365, filed Dec. 20, 2017, which claims priority to U.S. Provisional Patent Application No. 62/436,996, filed Dec. 20, 2016 and U.S. Provisional Patent Application No. 62/607,346, filed Dec. 19, 2017, which applications are incorporated herein by reference. To the extent appropriate, a claim of priority is made to each of the above-disclosed applications.

FIELD OF THE DISCLOSED TECHNIQUE

The disclosed technique relates to weight scales in general, and to systems and methods for weight scales systems for hospital beds in particular.

BACKGROUND OF THE DISCLOSED TECHNIQUE

Weighing immobile object, specifically objects which cannot be lifted by a human may be challenging, for example, weighing patients on a hospital bed. Known in the art techniques include placing an inflatable mattress under the patient. A further challenge is referencing the weight scales.

PCT Application Publication WO 1990/002927 to Broome, entitled "Method and device for weighing, especially of seriously ill patients confined to bed" describes a system for determining the weight of a patient confined to a bed. The system includes an inflatable mattress, a compressor, a compressed air container and pressure sensors. The inflatable mattress is laced beforehand an inflatable mattress in the bed under the patient. When weighing is carried out, the mattress is inflated with compressed air until the patient is balanced. The compressed-air supply is interrupted, and a previously measured exact quantity of air is supplied to the mattress. The change of pressure caused by the patient's load on the exact quantity of air supplied to the mattress is measured and converted into weight. The exact quantity of air supplied by filling the compressed air container until the pressure therein reaches a predetermined level. The air in the container is then transferred to the inflatable mattress.

U.K. Patent GB2453371B to Robinson, entitled "Mattress pump apparatus controller, mattress pump apparatus, mattress and method of controlling a mattress" directs to a system which detects when a weight is placed on the mattress and then determines the weight of the mattress. To that end, the mattress is filled to a predetermined initial pressure. When a load is placed on the mattress, a change in the pressure is detected. This change relates to the weight of the patient.

U.S. Pat. No. 5,861,582 to Flanagan et al, entitled "Patient weighing system" directs to a patient weighing system which includes load sensing casters or load lift modules installed on a hospital bed. The casters and load lift modules each include pneumatic lifts. The lifts are operative to load and unload the weight of the device onto a piezoelectric load cells. The load cells are electrically connected to control units which include visual displays. In operation, the operator then pumps a foot pedal to pressurize the pneumatic lines and to expand chambers in each of the housings. This unloads the load cells. After waiting a brief period of time which relates to the discharge time of the load cells, the processor resets itself so that the signal from each load cell is considered to be a zero value.

SUMMARY OF THE PRESENT DISCLOSED TECHNIQUE

It is an object of the disclosed technique to provide a novel weight scale system and method system for measuring the weight of at least one object. In accordance with the disclosed technique, there is thus provided a system for measuring the weight of at least one object. The weight scale system includes a bed section, vertical separator actuator and a controller. The bed section includes a lower platform, an upper platform for bearing the weight of the at least one object, at least one weight sensor assembly and at least one vertical separator. The at least one weight sensor assembly includes at least one weight sensor, and is located on the lower platform. The at least one weight sensor is operable to measure weight applied thereon. The at least one vertical separator is operable to detach the upper platform from the at least one weight sensor assembly. The at least one vertical separator actuator is coupled with the vertical separator and is operable to operate the vertical separator. The controller is coupled with the at least one weight sensor and with the vertical separator actuator. The controller directs the vertical separator actuator to operate the bed section in at least two modes, a referencing mode and a weighing mode. In the referencing mode the vertical separator detaches the upper platform from the at least one weight sensor assembly, thereby enabling the referencing of the at least one weight sensor. In the weighing mode the vertical separator re-attaches the upper platform with the at least one weight sensor assembly, such that the weight associated with the upper platform is fully applied on the at least one weight sensor.

In accordance with another aspect of the disclosed technique, there is thus provided a method for referencing at least one weight sensor in a weight scale system. The method incudes the procedures of detaching an upper platform of a bed section of a weight scale from the at least one sensor such that no weight is applied on the at least one weight sensor and referencing the at least one weight sensor. The bed section includes a lower platform, the upper platform bearing the weight of at least one object and the at least one weight sensor. The at least one weight sensor is located on the lower platform and operable to measure weight applied thereon. The method further includes the procedure of re-attaching the upper platform to the at least one weight sensor such that the upper platform and the load thereon apply their full weight on the at least one weight sensor.

BRIEF DESCRIPTION OF THE DRAWINGS

The disclosed technique will be understood and appreciated more fully from the following detailed description taken in conjunction with the drawings in which:

FIGS. 10A, 10B and 100 are schematic illustrations of a weight scales system, constructed and operative in accordance with another embodiment of the disclosed technique;

FIG. 13B is a schematic illustration of an exemplary weight sensors, constructed and operative in accordance with a further embodiment of the disclosed technique.

DETAILED DESCRIPTION OF THE EMBODIMENTS

Figure 1:
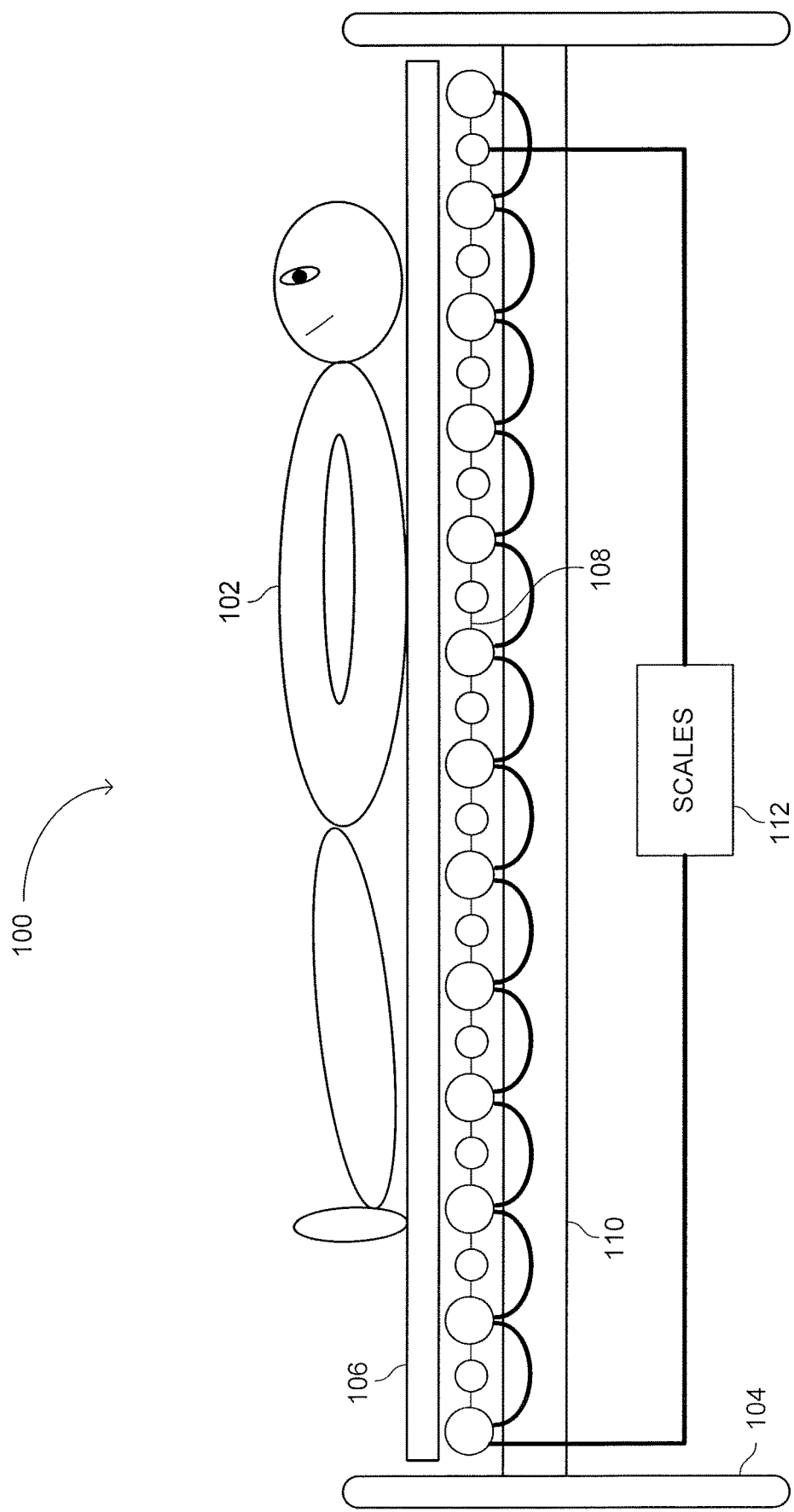
FIG. 1 is a schematic illustration of a weighing scenario, in accordance with an embodiment of the disclosed technique.

The disclosed technique overcomes the disadvantages of the prior art by providing a system and method for determining the weight of immobile objects, specifically patients lying on a bed. According to the disclosed technique, a weighing mattress is placed between the bed platform and the bed mattress. The weighing mattress includes weighing segments and reference segments. The weighing segments and the reference segments are full with a fluid. The weighing segments are all fluidally coupled with each other and with a weight sensor. The reference segments are all fluidally coupled with each other and with a reference sensor. The weighing segments and the reference segments are mechanically coupled therebetween. The weight sensor measures the pressure of the fluid in weighing segments. The reference sensor measures the pressure of the fluid in reference segments. A processor subtracts the reference pressure form the weighing pressure to determine a difference pressure and determines the weight of the object placed on top of the bed according to this difference pressure. According to the disclosed technique, and as further elaborated below, the weight of the object is not applied on reference segments. Thus, the pressure in the reference segments is only affected by changes in environmental conditions. Subtracting the reference pressure from the weighing pressure alleviates the effects of the environmental conditions on the pressure of the fluid in the weighing segments Reference is now made to FIG. 1, which is a schematic illustration of a weighing scenario, generally referenced 100, in accordance with an embodiment of the disclosed technique. In scenario 100, a patient 102 lies on a bed 104, on top of a mattress 106. A weighing mattress 108 is located between the platform 110 of bed 104 and mattress 106. Scales 112 measure the weight of patient 102, as further elaborated below. Scales 112 may indicate to a user the weight of patient 102. For example, scales 112 present the weight of patient 112 on a display.

Figure 2:
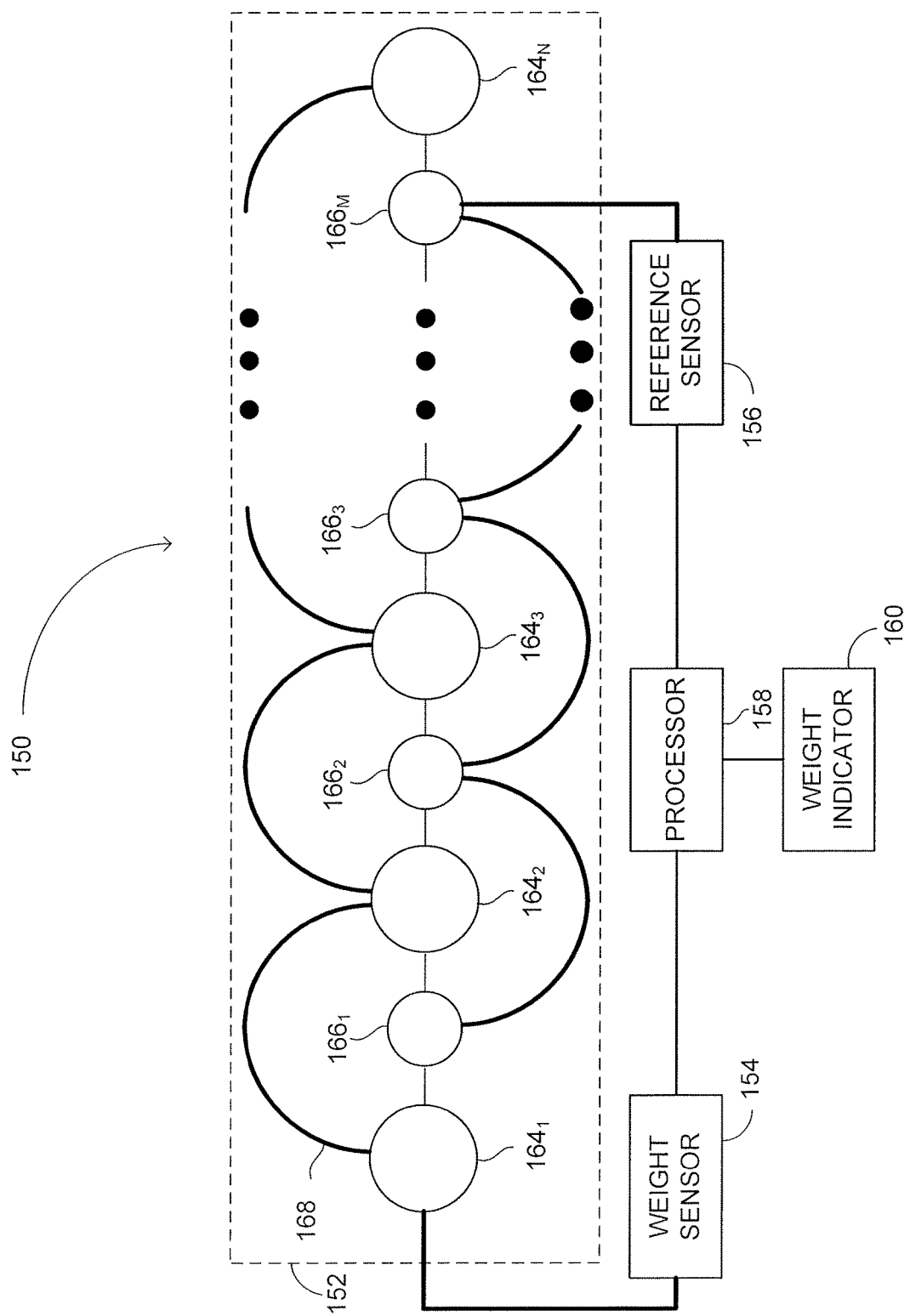
FIG. 2, is a schematic illustration of a mattress weight scales system constructed and operative in accordance with another embodiment of the disclosed technique.

Reference is now made to FIG. 2, which is a schematic illustration of a mattress weight scales system, generally referenced 150, constructed and operative in accordance with another embodiment of the disclosed technique. Mattress weight scales system 150 includes a weighing mattress 152, a weight sensor 154, a reference sensor 156, a processor 158, and a weight indicator 160. Weighing mattress 152 includes a plurality of weighing segments $164_1$, $164_2$, $164_3$, ..., $164_N$ and a plurality of reference segments $166_1$, $166_2$, $166_3$, ..., $166_M$, where N and M are integers.

Reference segments $166_1$, $166_2$, $166_3$, ..., $166_M$ are interleaved between weighing segments $164_1$, $164_2$, $164_3$, ..., $164_N$ along the mattress. FIG. 2 depicts the cross section of weighing segments $164_1$, $164_2$, $164_3$, ..., $164_N$ and reference segments $166_1$, $166_2$, $166_3$, ..., $166_M$. In FIG. 2, weighing segments $164_1$, $164_2$, $164_3$, ..., $164_N$ and reference segments $166_1$, $166_2$, $166_3$, ..., $166_M$ are exemplified as tubes. In the example depicted in FIG. 2, the thickness of weighing segments $164_1$, $164_2$, $164_3$, ..., $164_N$ is larger than the thickness of reference segments $166_1$, $166_2$, $166_3$, ..., $166_M$. When weighing segments $164_1$, $164_2$, $164_3$, ..., $164_N$ and reference segments $166_1$, $166_2$, $166_3$, ..., $166_M$ are embodied as tubes, the diameter weighing segments $164_1$, $164_2$, $164_3$, ..., $164_N$ is larger than the diameter of reference segments $166_1$, $166_2$, $166_3$, ..., $166_M$.

Each one of weighing segments $164_1$, $164_2$, $164_3$, ..., $164_N$ and reference segments $166_1$, $166_2$, $166_3$, ..., $166_M$ is full with a fluid (e.g., water, oil, gas). Weight sensor 154 and reference sensors 156 are typically fluid pressure transducers converting pressure applied on the sensor to a corresponding electrical signal. Weight indicator 160 is, for example, a display which presents the user with a numerical representation of the weight of the object being weighted. As a further example, weight indicator 160 a sound indicator producing a sound uttering the weight of the object.

In the example brought forth in FIG. 2, weighing segments $164_1$, $164_2$, $164_3$, ..., $164_N$ are mechanically coupled with reference segments $166_1$, $166_2$, $166_3$, ..., $166_M$. Weighing segments $164_1$, $164_2$, $164_3$, ..., $164_N$ are fluidally coupled therebetween. The term 'fluidally coupled' relates herein to the ability of fluid to freely flow between the segments and components. Reference segments $166_1$, $166_2$, $166_3$, ..., $166_M$ are also fluidally coupled therebetween. It is, however, noted that weighing segments $164_1$, $164_2$, $164_3$, ..., $164_N$ are not fluidally coupled with reference segments $166_1$, $166_2$, $166_3$, ..., $166_M$. Furthermore, weighing segments $164_1$, $164_2$, $164_3$, ..., $164_N$ are fluidally coupled with weight sensor 154. Reference segments $166_1$, $166_2$, $166_3$, ..., $166_M$ are fluidally coupled with reference sensor 156. Processor 158 is coupled with weight sensor 154, reference sensor 156, and weight indicator 160.

Weight sensor 154 measures the pressure of the fluid in weighing segments $164_1$, $164_2$, $164_3$, ..., $164_N$ and provides processor 152 with a signal indicative of the measured pressure. Similarly reference sensor 156 measures the pressure of the fluid in reference segments $166_1$, $166_2$, $166_3$, ..., $166_M$ and provides processor 158 with a signal (e.g., electric voltage or electric current) indicative of the measured pressure. The term 'measure' relates herein to the process converting pressure applied on the sensor to an electrical signal corresponding to a pressure applied on either weight sensor 154 or reference sensor 156. The term 'measurement' refers herein to the signal relating to the pressure in either weight sensor 154 or reference sensor 156 (i.e., either the signal produced by weight sensor 154 and reference sensor 156 or a sampled version thereof). The measurement from weight sensor 154 is referred to herein as 'the weighing measurement' and the measurement form reference sensor 156 is referred to herein as 'the reference measurement'. Also the pressure in weighing segments $164_1$, $164_2$, $164_3$, ..., $164_N$ is referred to herein as 'the weighing pressure' and the pressure in in reference segments $166_1$, $166_2$, $166_3$, ..., $166_M$ is referred to as 'the reference pressure'

When measuring the weight of an object (e.g., a patient), the object is placed on top weighing mattress 152. However, weighing segments $164_1$, $164_2$, $164_3$, ..., $164_N$ are affected by the weight of the object. The change in pressure of the fluid in weighing segments $164_1$, $164_2$, $164_3$, ..., $164_N$ relates to the weight of the object as well as to effects of environmental conditions. However, the effects of the environmental conditions (i.e., at least of ambient temperature) on the measurements are unknown. Furthermore, the inventors have discovered that these environmental effects are not uniform along the length of the weighing mattress. Since the reference segments are not affected by the weight of the object, the pressure of the fluid in these segments is affected only by the change in environmental conditions along the mattress. To determine the weight of the object on top of weighing mattress 152, processor 158 subtracts the reference measurement from the weighing measurement and determines the weight of the object on weighing mattress 152 therefrom as further explained below. Thus, processor 158 alleviates the effects of the environmental condition on the weighing measurement. In other words, processor 158 determines a difference measurement by subtracting the reference measurement from the weighing measurement and determines the weight of the object on weighing mattress 152 according to this difference measurement as further explained below.

Prior to use, mattress weight scale system 150 is calibrated to determine a correspondence between the difference measurement determined from the weighing measurement and the reference measurement, and the weight of the object on top of weighing mattress 152. To that end, each of a plurality of objects of different known weights is placed separately on weighing mattress 152, and processor 158 determines a respective difference measurement as explained above. Processor 158 also determines a difference measurement when no weight is placed on weighing mattress 152. Since the weights placed on weighing mattress 152 are known, a correspondence is determined between the difference measurement respective of each weight and the respective weight. This correspondence is employed to determine the weight of the object on top of weighing mattress 152 according to the determined difference measurement. This correspondence may take the form of a Look Up Table (LUT). Alternatively, a curve may be fitted to the measured weights and corresponding difference measurements. The environmental conditions during the calibration should be within the designed operational range of the mattress weight scale.

Figure 3:
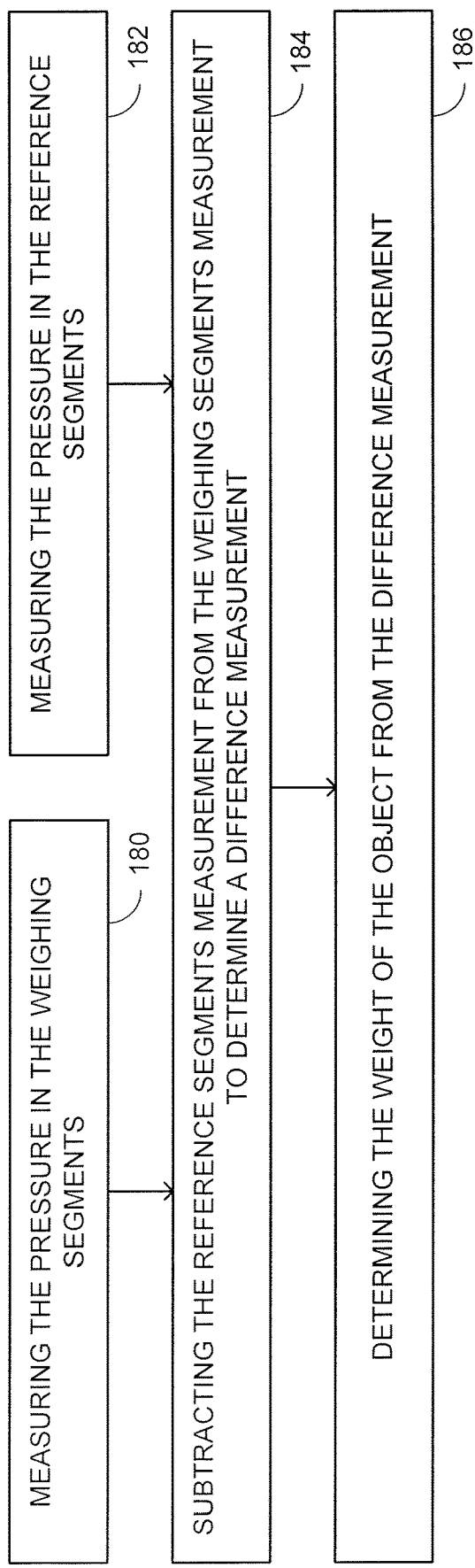
FIG. 3 is a schematic illustration of method for measuring the weight of an object, placed on top of a mattress weight scale, operative in accordance with a further embodiment of the disclosed technique.

Reference is now made to FIG. 3, which is a schematic illustration of method for measuring the weight of an object, placed on top of a mattress weight scale, operative in accordance with a further embodiment of the disclosed technique. In procedure 180, the pressure in the pressure in the weighing segments is measured. With reference to FIG. 2, weight sensor 154 measures the pressure in the weighing segments.

In procedure 182, the pressure in the reference segments are measured. With reference to FIG. 2, weight sensor 156 measures the pressure in the weighing segments.

In procedure 184, the reference segments measurement is subtracted from the weighing segments measurement to determine a difference measurement. With reference to FIG. 2, processor 158 subtracts the reference measurement from the weighing measurement.

In procedure 186, the weight of the object is determined from the difference measurement. The weight of the object is determined from the difference measurement, according to a correspondence between various different weights and a corresponding difference measurement. This correspondence is determined before using the mattress weight scale. With reference to FIG. 2, processor 158 determines the weight of the object according to the difference measurement When the fluid employed in the weighing and reference segments is gas, the gas inside the segments may leak between measurements either from the weighing segments, or from reference segments, or from both. These variations in the amount of re-filled gas may result in variations in the pressure of the gas inside the mattress weight scale, which may result in ambiguity in the determined weight. To alleviate this ambiguity, the weighing mattress of a mattress weight scales system should be refilled with gas before each weighing. To that end, a re-filling mechanism is connected to the weighing and reference segments.

Reference is now made to FIGS. 4A-4D, which are schematic illustrations of a mattress weight scales system, generally referenced 200, constructed and operative in accordance with another embodiment of the disclosed technique. Mattress weight scales system 200 includes a weighing mattress 202, a valves assembly 204 and a pump 206. Mattress weight scales system 200 further includes a weight sensor 208, a reference sensor 210 a processor 212, and a weight indicator 212. Weighing mattress 202 includes a plurality of weighing segments $218_1$, $218_2$, $218_3$, ..., $218_N$ and a plurality of reference segments $220_1$, $220_2$, $220_3$, ..., $220_M$ where N and M are integers. Valve assembly 204 includes values 224, 226, 228, 230, 232 and 234. In the example brought forth in FIGS. 4A-4D, valve assembly 204 is depicted as including six two-way values. However, valve assembly 204 may be configured with three, three-way valves. Also, for the sake of simplicity of the explanation which follows, the ports of each one of two-way valves 224, 226, 228, 230, 232 and 234 are number in FIGS. 4A-4D, 1 and 2

Weighing segments $218_1$, $218_2$, $218_3$, ..., $218_N$ and reference segments $220_1$, $220_2$, $220_3$, ..., $220_M$ are similar to weighing segments $164_1$, $164_2$, $164_3$, ..., $164_N$ and reference segments $166_1$, $166_2$, $166_3$, ..., $166_M$ described hereinabove in conjunction with FIG. 2. As such, reference segments $220_1$, $220_2$, $220_3$, ..., $220_M$ are interleaved between weighing segments $218_1$, $218_2$, $218_3$, ..., $218_N$ along the mattress. FIGS. 4A-4D depicts the cross section of weighing segments $218_1$, $218_2$, $218_3$, ..., $218_N$ and reference segments $220_1$, $220_2$, $220_3$, ..., $220_M$. In FIGS. 4A-4D, weighing segments $218_1$, $218_2$, $218_3$, ..., $218_N$ and reference segments $220_1$, $220_2$, $220_3$, ..., $220_M$ are exemplified as tubes. In the example depicted in Figures ..., the thickness of weighing segments $218_1$, $218_2$, $218_3$, ..., $218_N$ is larger than the thickness of reference segments $220_1$, $220_2$, $220_3$, ..., $220_M$.

Each one of weighing segments $218_1$, $218_2$, $218_3$, ..., $218_N$ and reference segments $220_1$, $220_2$, $220_3$, ..., $220_M$ is full with a fluid (e.g., water, oil, gas). Weight sensor 208 and reference sensors 210 are typically fluid pressure transducers converting pressure applied on the sensor to a corresponding electrical signal. Weight indicator 214 is, for example, a display which presents the user with a numerical representation of the weight of the object being weighted. As a further example, weight indicator 214 a sound indicator producing a sound uttering the weight of the object.

Also similar to as described above in conjunction with FIG. 2, weighing segments $218_1$, $218_2$, $218_3$, ..., $218_N$ are mechanically coupled with reference segments $220_1$, $220_2$, $220_3$, ..., $220_M$. Weighing segments $218_1$, $218_2$, $218_3$, ..., $218_N$ are fluidly coupled therebetween. The term 'fluidly coupled' relates herein to the ability of fluid to freely flow between the segments and components. Reference segments $220_1$, $220_2$, $220_3$, ..., $220_M$ are also fluidly coupled therebetween. It is, however, noted that weighing segments $218_1$, $218_2$, $218_3$, ..., $218_N$ are not fluidly coupled with reference segments $220_1$, $220_2$, $220_3$, ..., $220_M$. Furthermore, weighing segments $218_1$, $218_2$, $218_3$, ..., $218_N$ are fluidly coupled with weight sensor 208. Reference segments $220_1$, $220_2$, $220_3$, ..., $220_M$ are fluidly coupled with reference sensor 210. Processor 212 is coupled with pump 206, weight sensor 208, reference sensor 210, and weight indicator 212. Furthermore, weighing segments $218_1$, $218_2$, $218_3$, ..., $218_N$ and reference segments $220_1$, $220_2$, $220_3$, ..., $220_M$ are fluidly coupled with valve assembly 204. Specifically, in the example brought forth in FIGS. 4A-4D, port 1 of valve 228 and port 2 of valve 234 are fluidly coupled with a gas reservoir (e.g., ambient air—not shown). The output port of pump 206, port 2 of valve 228 and port 2 of valve 226 are fluidly coupled therebetween. The input port of pump 206, port 1 of valve 223 and port 1 of valve 260 are fluidly coupled therebetween. Port 2 of valve 230, reference segments $220_1$, $220_2$, $220_3$, ..., $220_M$ and port 1 of valve 232 are fluidly there between. Port 2 of valve 224, port 1 of valve 226 and port 2 of valve 232 are fluidly coupled therebetween. Port 1 of valve 224 is fluidly coupled with weighing segments $218_1$, $218_2$, $218_3$, ..., $218_N$.

As mentioned above, prior to measuring the weight of the object, and optionally while the object is placed on top weighing mattress 202, weighing segments $218_1$, $218_2$, $218_3$, ..., $218_N$ are filled gas by filling reference segments $220_1$, $220_2$, $220_3$, ..., $220_M$ with gas until the gas in reference segments $220_1$, $220_2$, $220_3$, ..., $220_M$ reaches a predetermined pressure, and transferring the gas weighing segments $218_1$, $218_2$, $218_3$, ..., $218_N$. This may be repeated for a predetermined number of times. Each filling of reference segments $220_1$, $220_2$, $220_3$, ..., $220_M$ with gas, and the transfer of gas to weighing segments $218_1$, $218_2$, $218_3$, ..., $218_N$ is referred to herein as a 'filling cycle'. After completing the predetermined number of filling cycles, reference segments $220_1$, $220_2$, $220_3$, ..., $220_M$ are once again filled with gas until the gas therein reaches the predetermined pressure. A filling cycle and the filling of reference segments $220_1$, $220_2$, $220_3$, ..., $220_M$ once again with gas, until the gas therein reaches the predetermined pressure, is referred to herein as 'filling the mattress'

Similar to as described above, the pressure of the gas in reference segments $220_1$, $220_2$, $220_3$, ..., $220_M$ is measured by reference sensor 210 which provides the weighing measurement to processor 212. The above predetermined pressure serves as the reference pressure as well. Thereafter, weight sensor 208 measures the weighing pressure when the object is placed on top of weighing mattress 202 and provides the weighing measurement to processor 212. Processor 212 subtracts the reference measurement from the weighing measurement to determine a difference measurement. Processor 212 determines the weight of the object according to a correspondence between various the difference measurements and respective weights (i.e., similar to as described above). It is noted that the same number of filling cycles should be employed when determining the weight of the object on top of weighing mattress 202 and when determining the correspondence between various the difference measurements and respective weights. It is further noted that, similar to as described above in conjunction with FIG. 2, since only weighing segments $218_1$, $218_2$, $218_3$, ..., $218_N$ are affected by the weight of the object, the change in pressure of the fluid in weighing segments $218_1$, $218_2$, $218_3$, ..., $218_N$ relates to the weight of the object as well as to effects of environmental conditions. Since reference segments $220_1$, $220_2$, $220_3$, ..., $220_M$ are not affected by the weight of the object, the pressure of the fluid in these segments is affected only by the change in environmental conditions along the mattress. By subtracting the reference measurement form the weighing measurement, processor 202 alleviates the effects of the unknown environmental conditions on the weighing measurement.

Figure 4A:
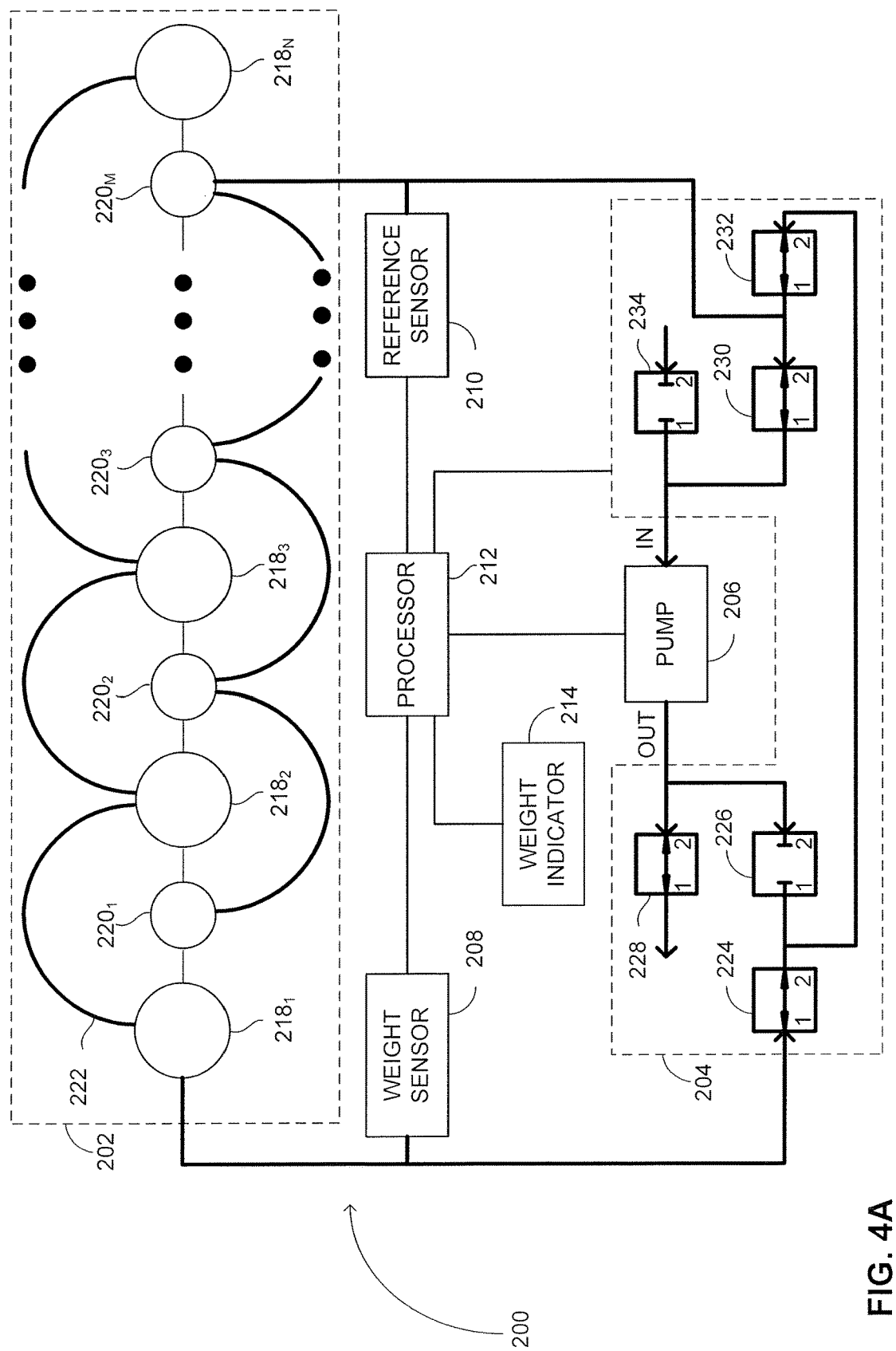
FIGS. 4A-4D are schematic illustrations of a mattress weight scales system, constructed and operative in accordance with another embodiment of the disclosed technique.

As mentioned above, prior to weighing the object a predetermined number of filling cycles are performed to fill weighing segments $218_1$, $218_2$, $218_3$, ..., $218_N$ with gas, after which reference segments $220_1$, $220_2$, $220_3$, ..., $220_M$ are filled with gas until the gas therein reaches a predetermined pressure. Following is a description of filling the mattress. With reference to FIG. 4A, initially any residual gas is emptied from weighing mattress (i.e., from both weighing segments $218_1$, $218_2$, $218_3$, ..., $218_N$ and reference segments $220_1$, $220_2$, $220_3$, ..., $220_M$). To that end, processor 212 directs valves 226 and 234 to the open state thereof and directs valves 224, 228, 230 and 232 to the closed state thereof. The open state relates to a state where no fluid can flow between the ports of the valve. The closed state, indicated by a double headed arrow, relates to a state where fluid can flow between the ports of the valve marked by the doubled headed arrow. Processor 212 then activates pump 206. The gas from weighing segments $218_1$, $218_2$, $218_3$, ..., $218_N$ flows through valves 224, 232, 230, through pump 206 and through valve 224 to the gas reservoir. The gas from reference segments $220_1$, $220_2$, $220_3$, ..., $220_M$ flows through valves 230, through pump 206 and through valve 224 to the gas reservoir. Processor 212 shuts down pump 206, for example, when the pressure of the gas in weighing segments $218_1$, $218_2$, $218_3$, ..., $218_N$ and reference segments $220_1$, $220_2$, $220_3$, ..., $220_M$ reaches zero.

Figure 4B:
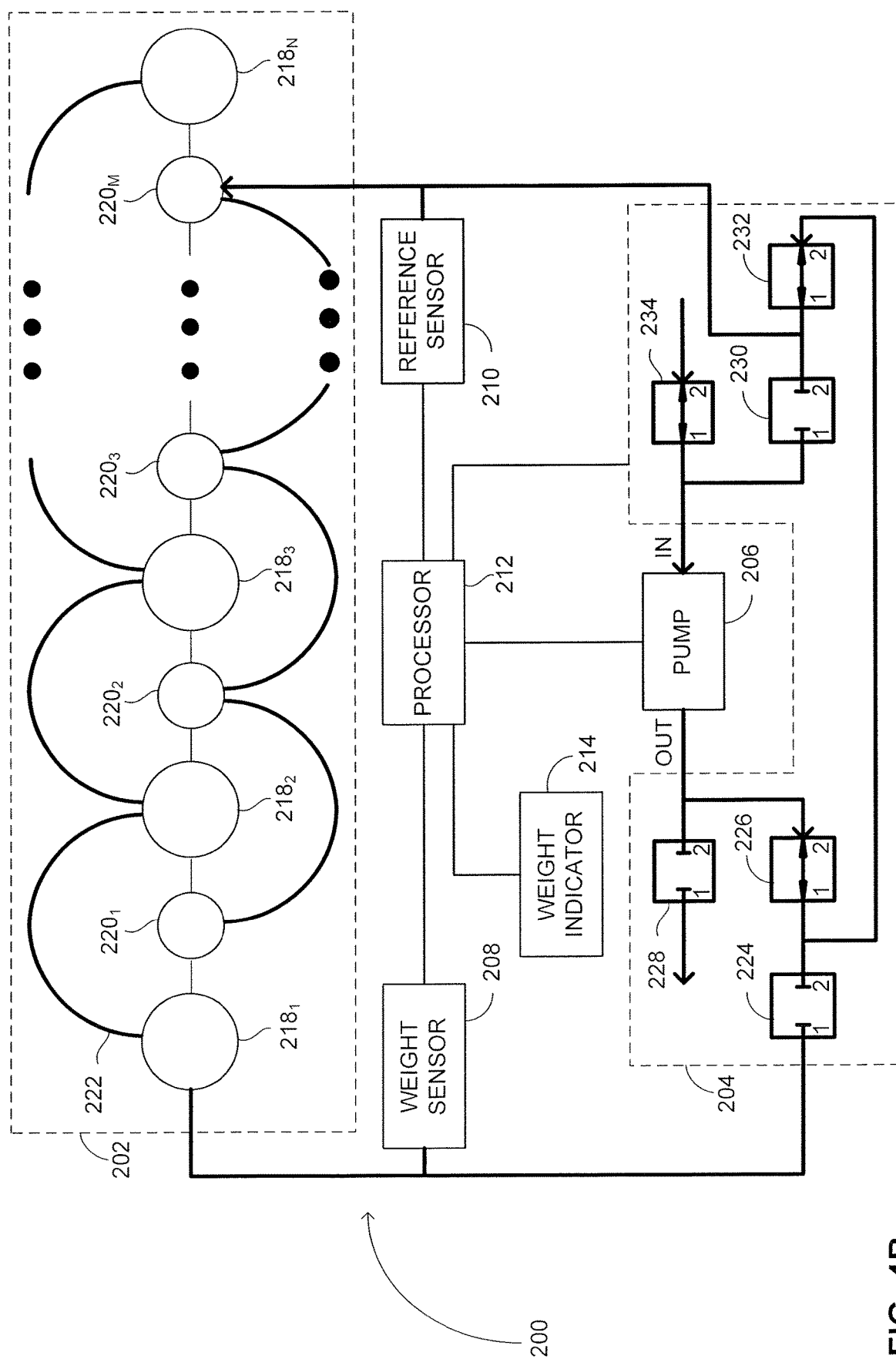

With reference to FIG. 4B, reference segments $220_1$, $220_2$, $220_3$, ..., $220_M$ are filled with gas until the gas therein reaches a predetermined pressure. To that end, processor 212 directs vales processor 212 directs valves 224, 228 and 230 to the open state thereof and directs valves 226, 232, and 234 to the closed state thereof. Processor 212 then activates pump 206 and the gas flows from the gas reservoir, through valve 234, pump 206, valve 232 and valve 234 into reference segments $220_1$, $220_2$, $220_3$, ..., $220_M$. When the pressure of the gas in reference segments $220_1$, $220_2$, $220_3$, ..., $220_M$ reaches a predetermined level, processor 212 shuts down pump 206.

Figure 4C:
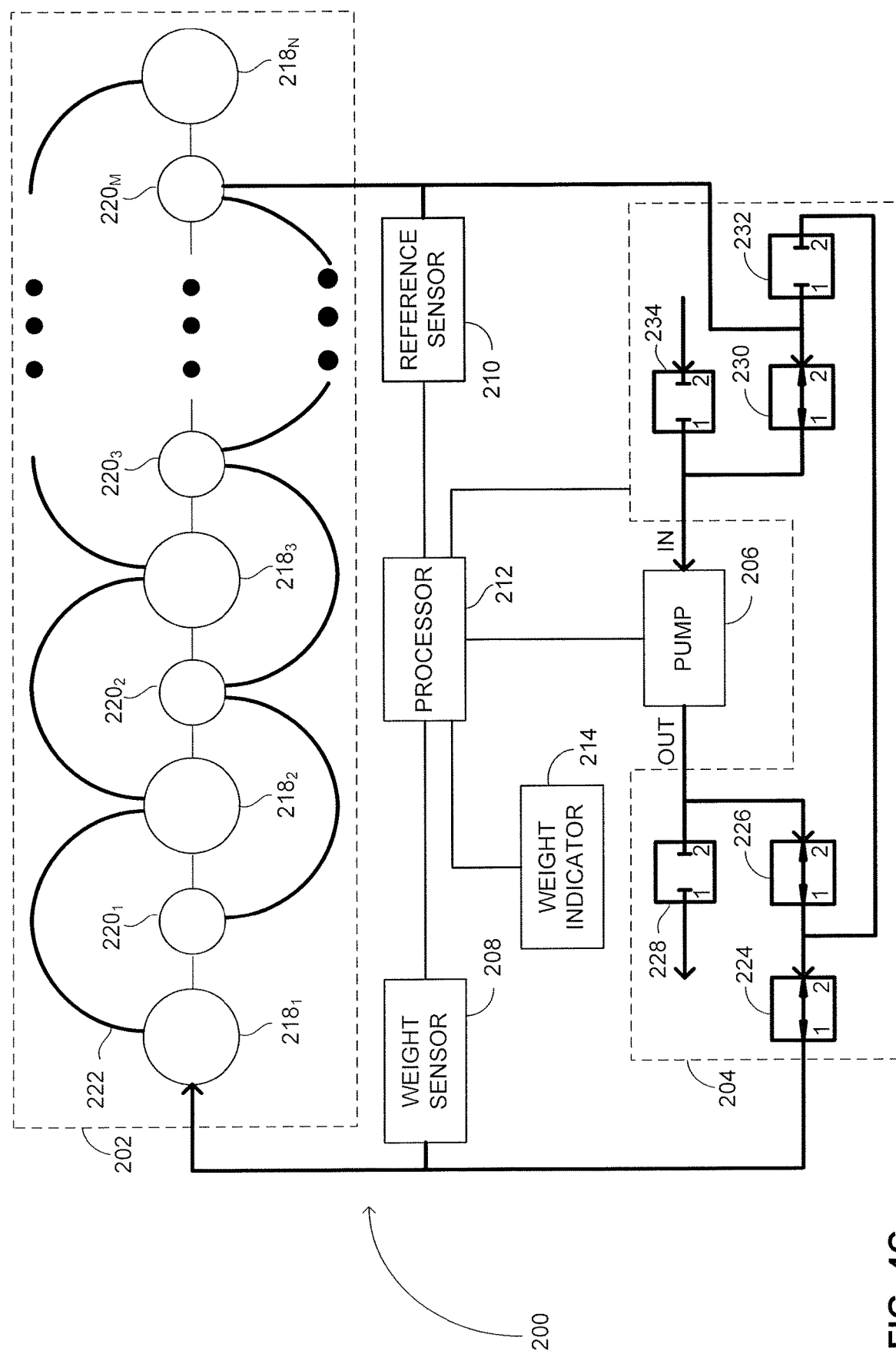
Figure 4D:
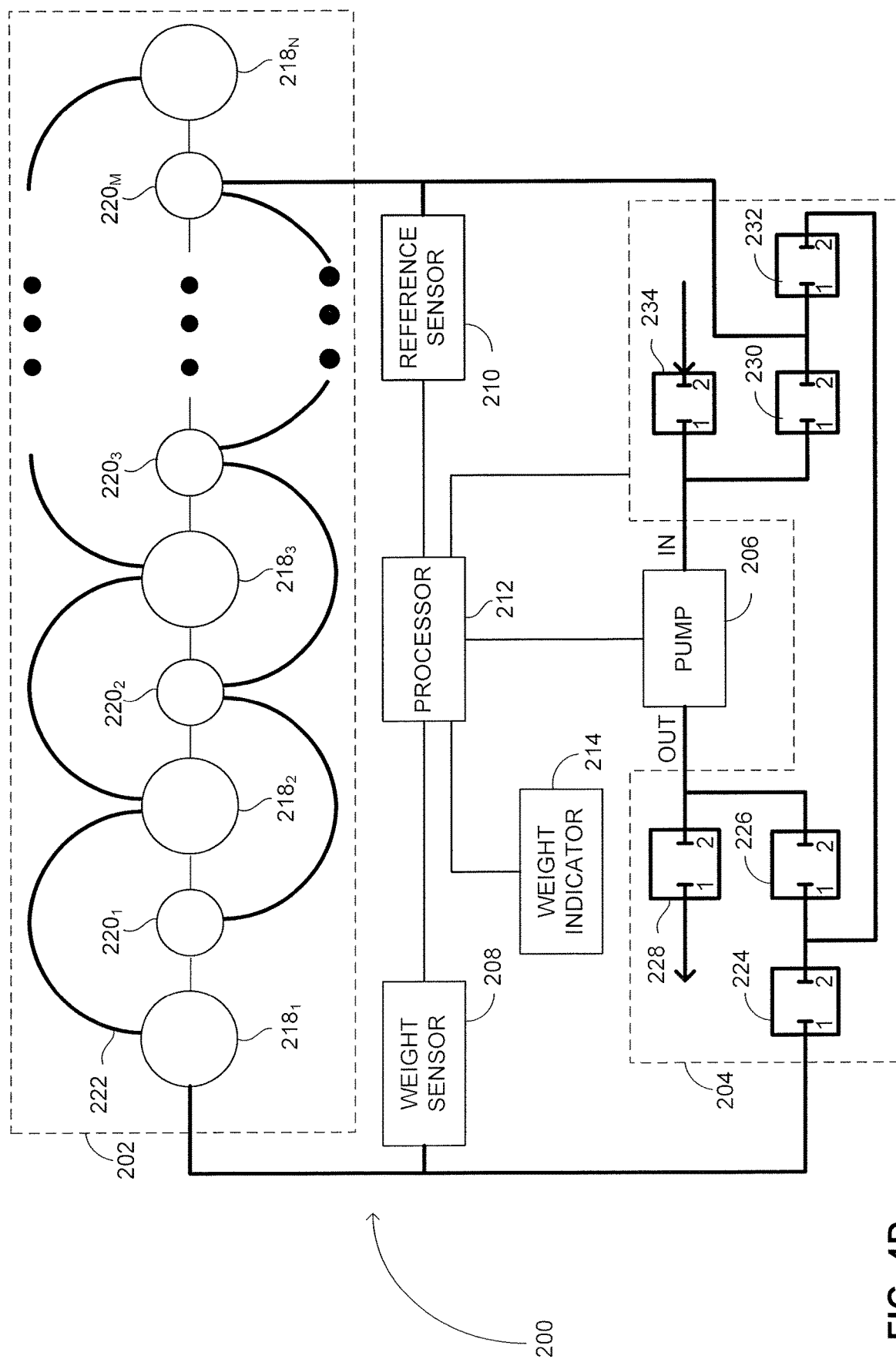

With reference to FIG. 4C, the gas in reference segments $220_1$, $220_2$, $220_3$, ..., $220_M$ is transferred to weighing segments $218_1$, $218_2$, $218_3$, ..., $218_N$. To that end, processor 212 directs valves 228, 232 and 234 to the open state thereof and valves 224, 226 and 230 to the closed state thereof. Processor 212 then activates pump 206 and the gas flows from reference segments $220_1$, $220_2$, $220_3$, ..., $220_M$ flows through valve 232, pump 206, valve 226 and valve 224 into weighing segments $218_1$, $218_2$, $218_3$, ..., $218_N$.

Thereafter, reference segments $220_1$, $220_2$, $220_3$, ..., $220_M$ similar to as described above in conjunction with FIG. 3B. Thereafter, with reference to FIG. 4D, processor 212 directs valves 224, 226, 228, 230, 232 and 234 to the open state thereof and acquires the weighing measurement and the reference measurement as described above.

Figure 5A:
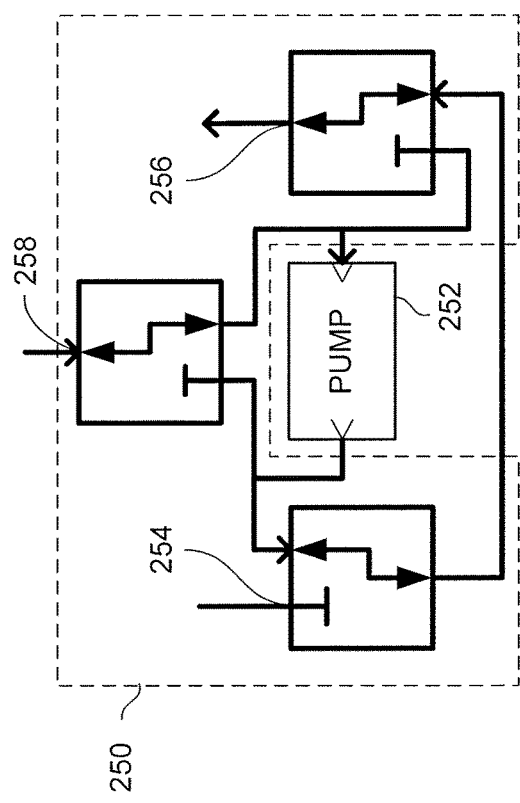
FIGS. 5A-5D are schematic illustrations of a valve assembly connected to a pump, in accordance with a further embodiment of the disclosed technique.
Figure 5B:
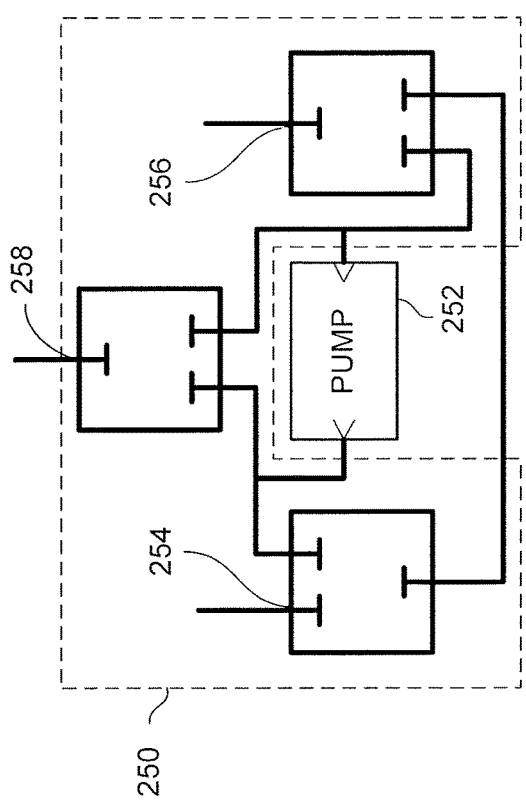
Figure 5C:
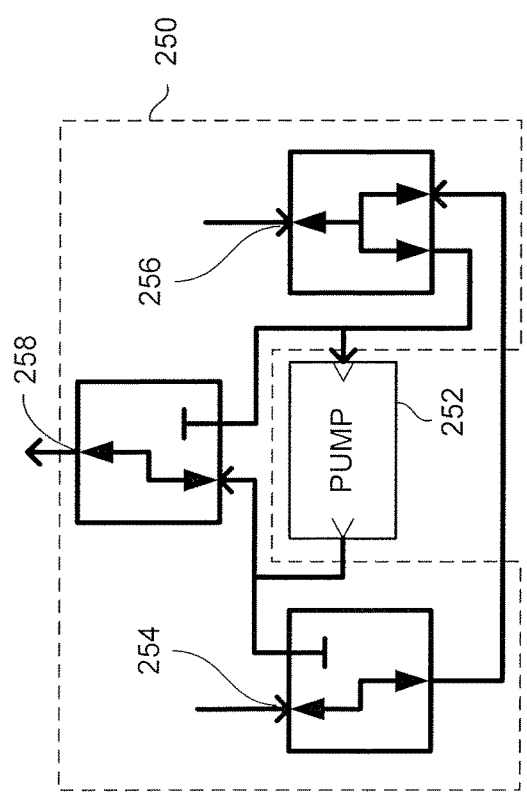
Figure 5D:
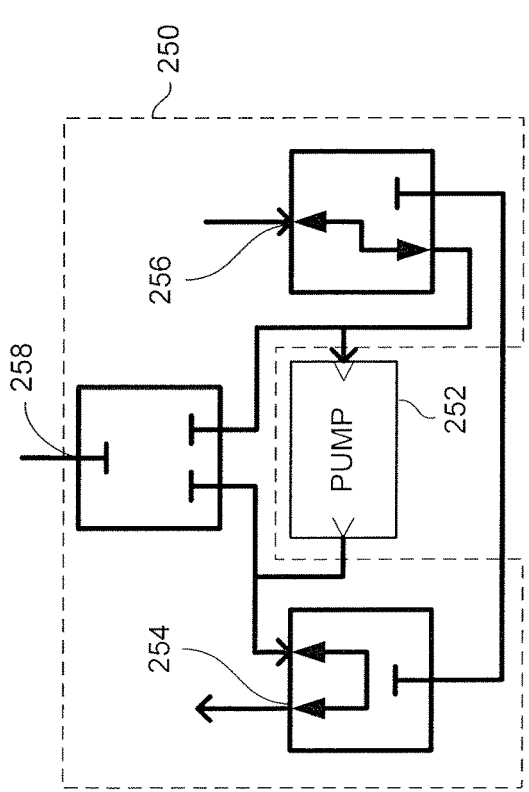

As mentioned above, valve assembly 204 (FIGS. 4A-4D) may be implemented with three three-way valves. Specifically the valve assembly may be implemented with three three-way valves where each valve has five states (i.e., all ports are closed, all ports are open and each pair of ports is open). Reference is now made to FIGS. 5A-5D, which are schematic illustrations of a valve assembly 250 connected to a pump 252, in accordance with a further embodiment of the disclosed technique. Port 254 is fluidally coupled with weighing segments (not shown), port 256 is fluidally coupled with reference segments (not shown) and port 258 is fluidally coupled with a gas reservoir (e.g., ambient air—not shown). FIG. 5A depicts the states of the valves when the weighing and reference are being emptied. FIG. 5B depicts the state of the valves when the reference segments are being filled with gas. FIG. 5C depicts the state of the valves when the gas is being transported from the reference segments to the weighing segments and FIG. 5D depicts the state of the valves when weight is being measured.

Figure 6A:
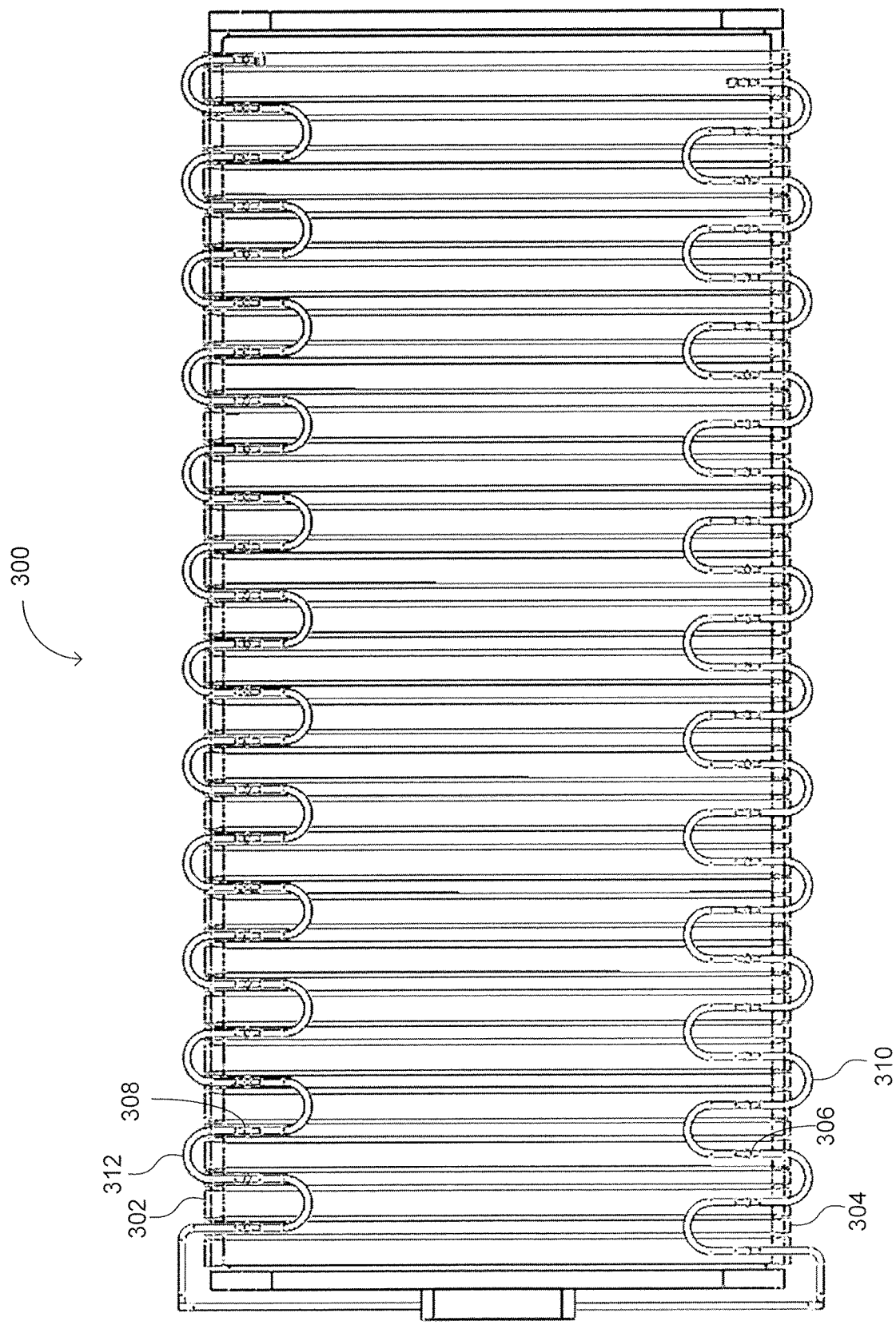
FIGS. 6A-6D are schematic illustrations of a weighing mattress, constructed and operative in accordance with another embodiment of the disclosed technique.

Reference is now made to FIGS. 6A-6D, which are schematic illustrations of a weighing mattress, generally referenced 300, constructed and operative in accordance with another embodiment of the disclosed technique. Weighing mattress 300 includes a plurality of weighing segments, such as weighing segment 302 and a plurality of reference segments, such as weighing segment 304, interleaved between the weighing segments. With reference to FIG. 6A, each weighing segment includes a respective fluid inlet/outlet such as fluid inlet/outlet 306. Each reference segment also includes a respective fluid inlet/outlet such as fluid inlet/outlet 308. The weighing segments are fluidally coupled therebetween with weighing connectors, such as weighing connected 310 which connects the fluid inlet/outlet of each adjacent pair of weighing segments. Similarly, the reference segments are fluidally coupled therebetween with reference connectors, such as weighing connected 312 which connects the fluid inlet/outlet of each adjacent pair of reference segments.

Figure 6B:
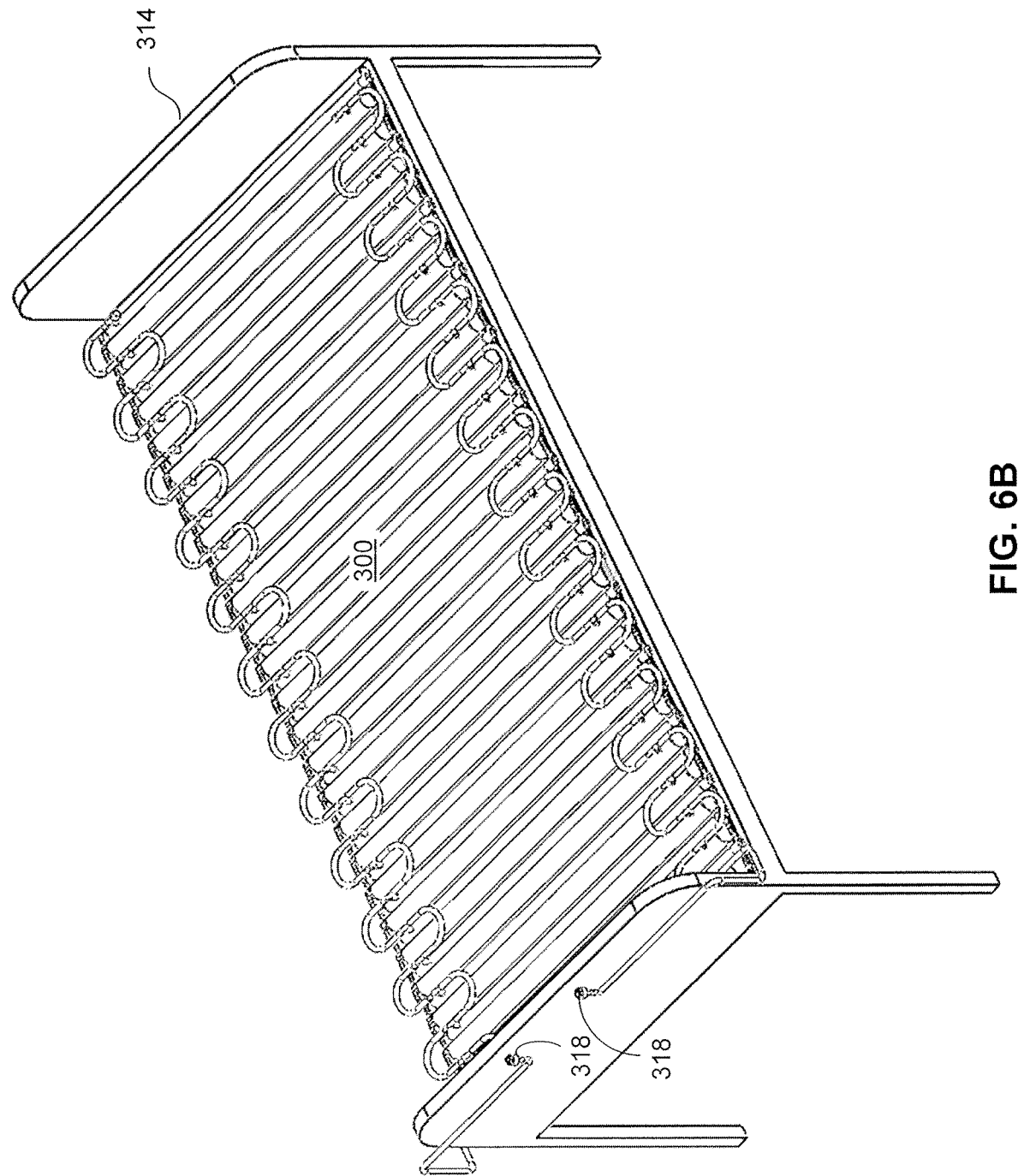
Figure 6C:
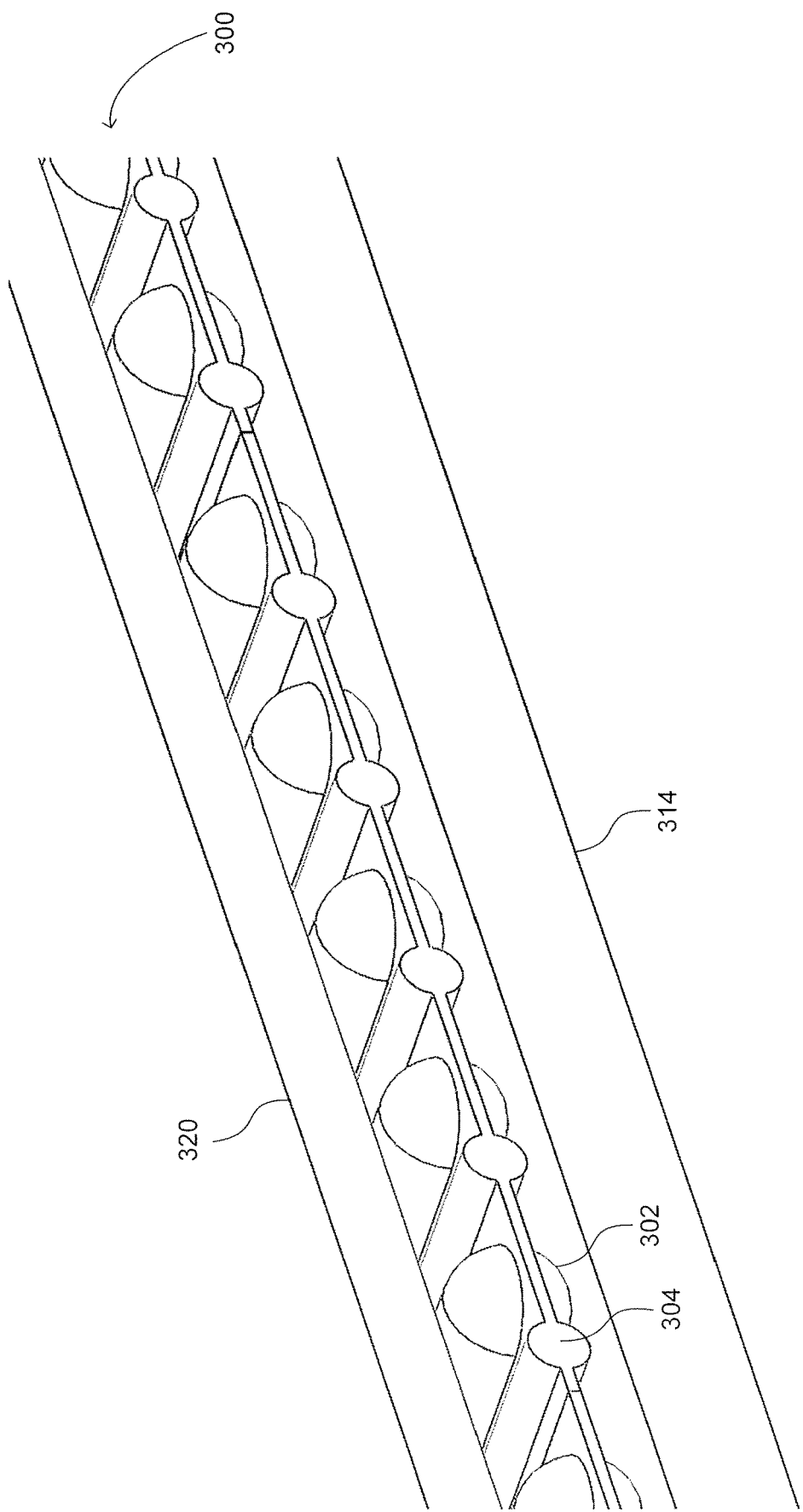
Figure 6D:
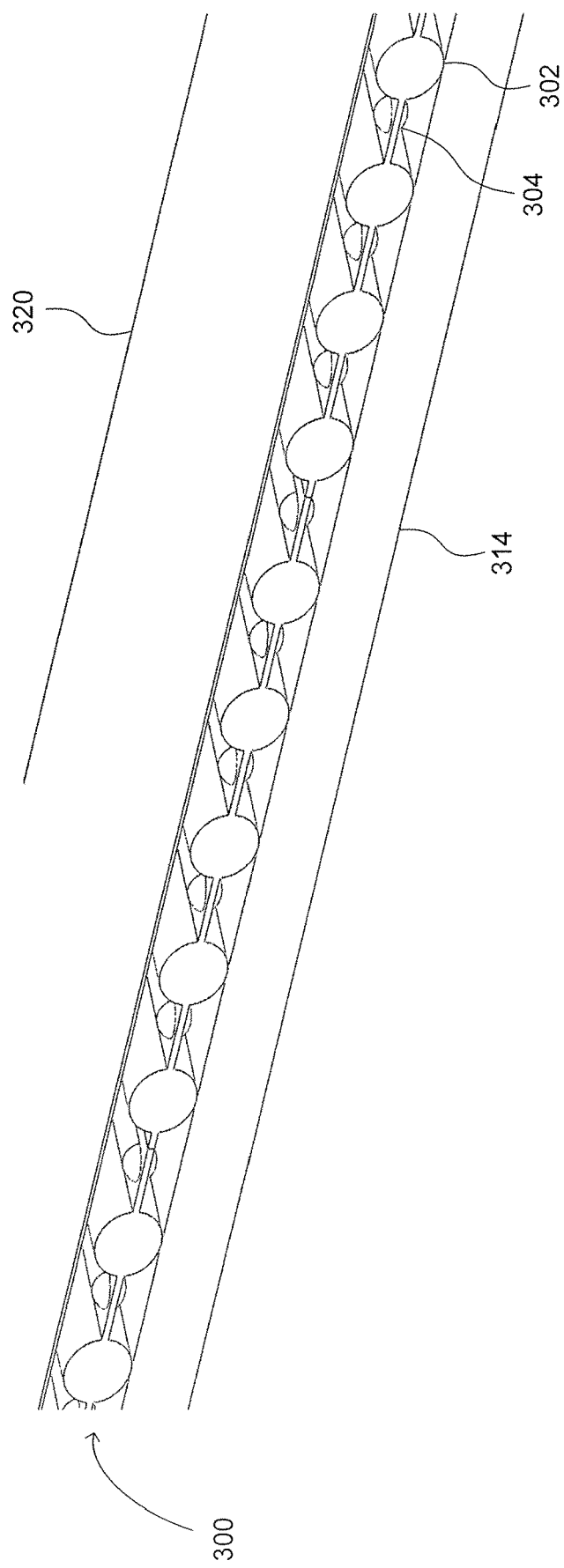

With reference to FIG. 6B, weighing mattress 300 is depicted placed on a bed 314. Also a weight sensor 316 is fluidally coupled with the weighing segments and a reference sensor 318 is fluidally coupled with the reference segments. With reference to FIGS. 6C and 6D, depicted therein are isometric views of one side of weighing matters 300, placed on bed 314, and a mattress 320 placed on top of weighing mattress 300. FIG. 6C depicts one side of weighing mattress 300 and FIG. 6D depicts the other side of weighing mattress 300.

Figure 7:
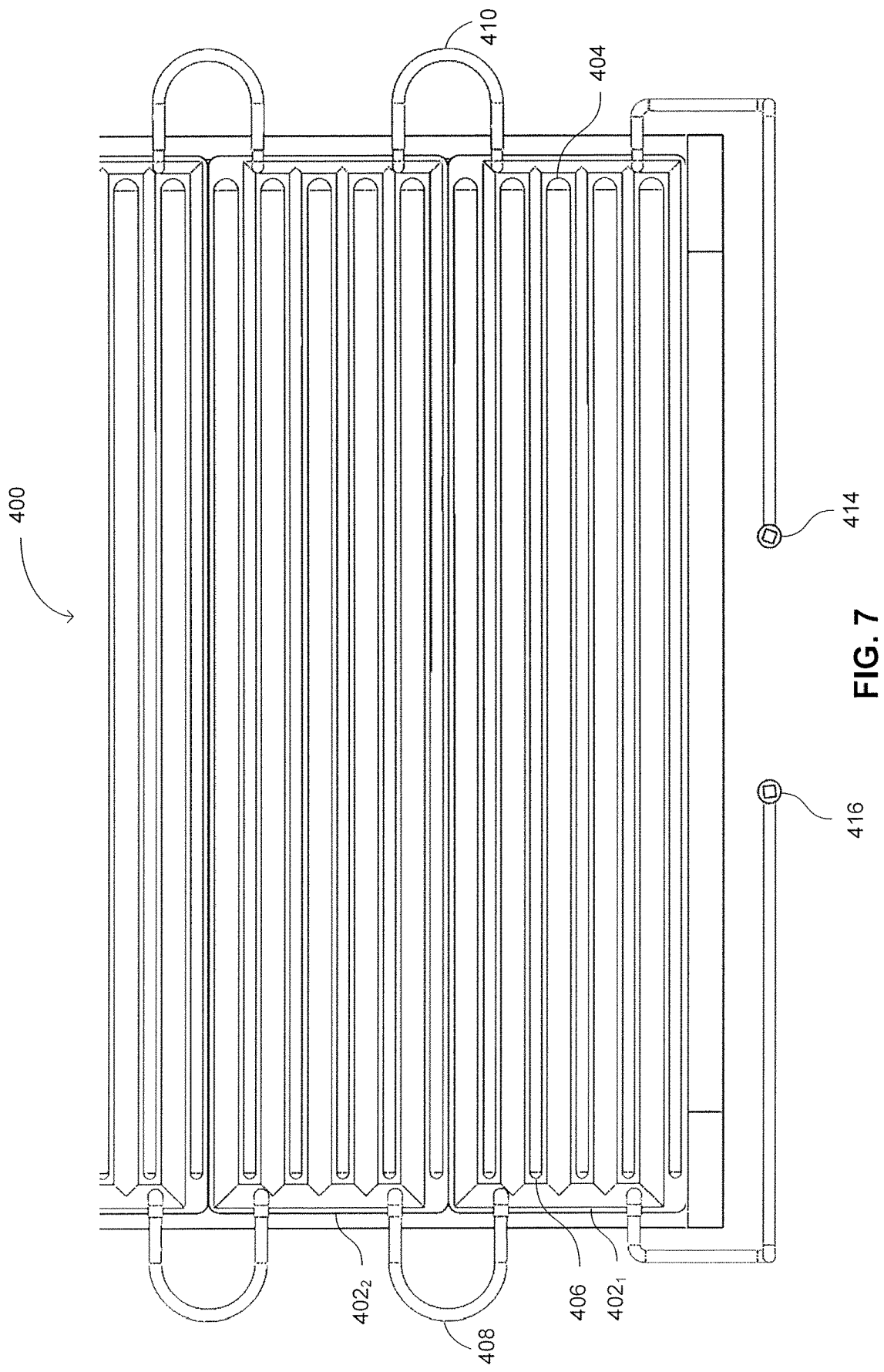
FIG. 7 is a schematic illustration of a weighing mattress, constructed and operative in accordance with a further embodiment of the disclosed technique.

Reference is now made to FIG. 7, which is a schematic illustration of a weighing mattress, generally referenced 400, constructed and operative in accordance with a further embodiment of the disclosed technique. Weighing mattress 400 is divided into a plurality of inflatable sections, such as sections $402_1$ and $402_2$. Each section is coupled with an adjacent section. Each section is welded such as to create a structure of two interleaved rakes. The fingers of one rake constitute weighing segments and the base of this rake fluidally couples the weighing segments. The fingers of the other rakes constitute reference segments and the base of this other rake fluidally couples the reference segments. Each rake in each section is independently inflatable. The inflatable rake, corresponding to the weighing segments, is fluidally coupled with a corresponding rake in an adjacent section via connectors, such as connectors 408, which are coupled with the fluid inlet/outlets of each rake. The inflatable rake, corresponding to the reference segments, is fluidally coupled with a corresponding rake in an adjacent section via connectors, such as connectors 410, which are coupled with the fluid inlet/outlets of each rake.

Figure 8:
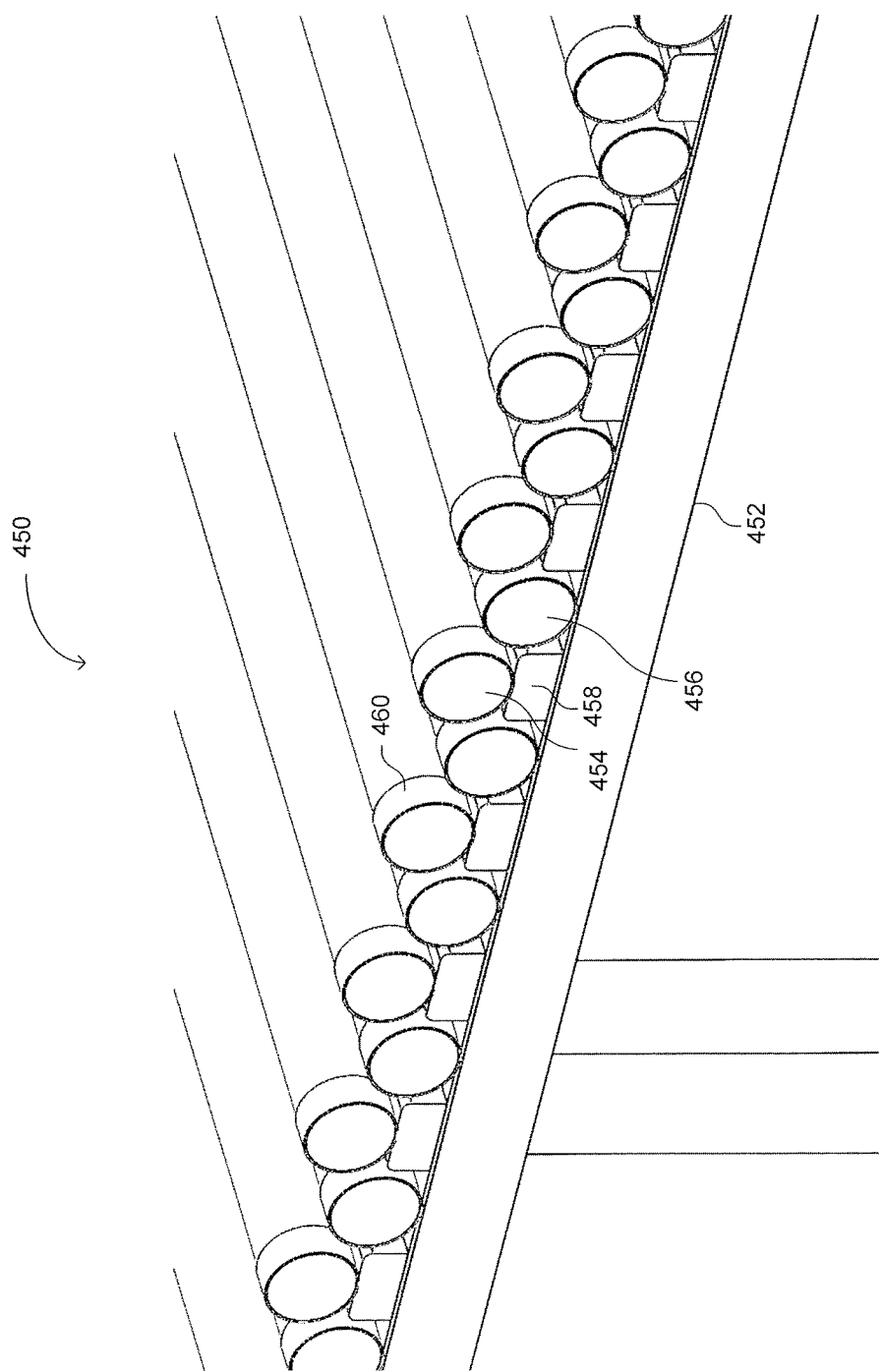
FIG. 8 is a schematic illustration of a weighing mattress, constructed and operative in accordance with another embodiment of the disclosed technique.

Reference is now made to FIG. 8, which is a schematic illustration of a weighing mattress, generally referenced 450, constructed and operative in accordance with another embodiment of the disclosed technique. Weighing mattress 450 is place on a bed 452. Weighing mattress 450 includes a plurality of weighing segments such as weighing segment 454 and a plurality of reference segments such as reference segment 456. The weighing segments and the reference segments exhibit the same thickness. However, only the weighing segments are affected by the weight of the objected, since the weighing segments are positioned on steps, such as step 458 (e.g., made from Styrofoam). The weighing segments and the reference segments are coupled with the mattress, for example, with straps, which are coupled (e.g., glued or welded) to a base.

Figure 9:
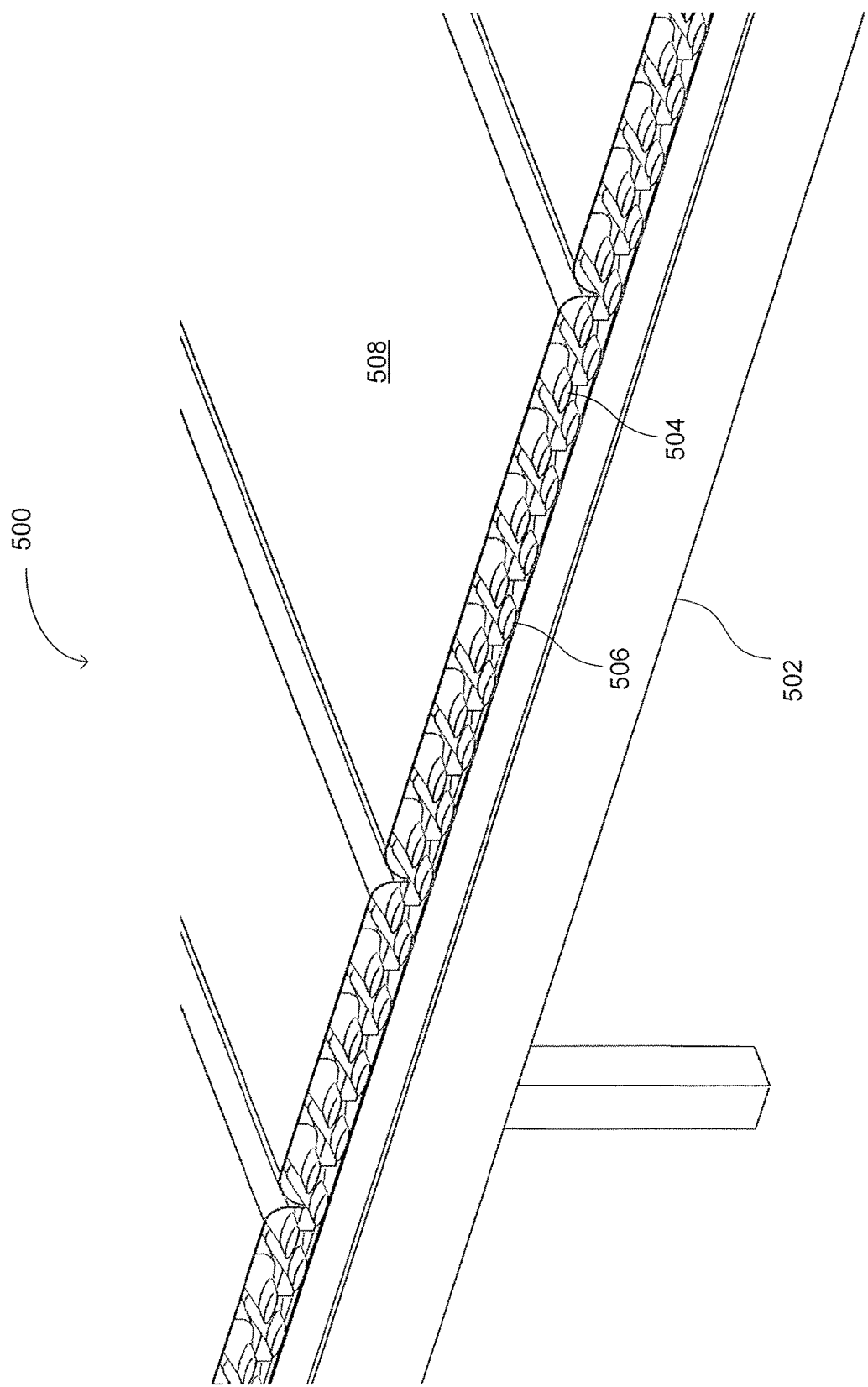
FIG. 9 is a schematic illustration of a weighing mattress, in accordance with a further embodiment of the disclosed technique.

In some scenarios, the accuracy of the weight scale mattress may be affected by a heat source (e.g., a human hand) which comes into contact or is located in proximity to the weighing mattress, more so if the heat source effects either the weighing segments or the reference segments. To reduce the effects of such a heat source, the weighing and reference segments may be covered with thermal isolation foils. These isolation foils reduce the effects of a heat source which may come into contact with the mattress weight scale. Reference is now made to FIG. 9, which is a schematic illustration of a weighing mattress, generally referenced 500, in accordance with a further embodiment of the disclosed technique. Weighing mattress 500 is placed on top of a bed 502. Weighing mattress 500 includes a plurality of weighing segments such as weighing segment 504 and a plurality of reference segments such as reference segment 506. The weighing segments and reference are covered with an isolation foil or foils, such as isolation foil 502. Isolation foil 508 is made, for example, from aluminum.

As mentioned above, measuring the pressure in the reference segments and determining a difference measurement alleviates the effects of environmental conditions on the pressure of the fluid in the weighing mattress. However, it is noted that employing a weighing mattress with a thermal coefficient of zero also alleviates the effects of the environmental conditions. A weighing mattress which exhibits a thermal coefficient of zero may be achieved by employing materials and fluids of positive and negative thermal coefficients.

In typical weighing systems, it is desirable to reference the sensor before performing a weight measurement. Referencing the weight sensors relates to associating a signal output from the sensor with a reference weight (e.g., the zero weight). Referencing the weight sensors alleviates errors in the sensor output signal (e.g., due to changes temperature, or drift in the sensor output signal). Typically, referencing the sensors entail lifting the patient from the bed, referencing the sensors, and returning the patient to the bed. According to the disclosed technique, the sensors may be referenced without lifting the patient off the bed (i.e., the patient remains lying on the mattress), by detaching the load of the patient from the weight sensors. Referring back to FIG. 4A, reference sensor 210 is referenced by completely deflating reference segments $220_1$, $220_2$, $220_3$, ..., $220_M$ and inflating weighing segments $218_1$, $218_2$, $218_3$, ..., $218_N$ such that the patient is detached from reference segments $220_1$, $220_2$, $220_3$, ..., $220_M$ (i.e., the patient does not come into contact with reference segments $220_1$, $220_2$, $220_3$, ..., $220_M$ and does not apply weight thereon) and reference sensor 210 is referenced. Similarly, weight sensor 208 is referenced by completely deflating reference weighing segments $218_1$, $218_2$, $218_3$, ..., $218_N$ and inflating segments $220_1$, $220_2$, $220_3$, ..., $220_M$ such that the patient is detached from weighing segments $218_1$, $218_2$, $218_3$, ..., $218_N$ (i.e., the patient does not come into contact with weighing segments $218_1$, $218_2$, $218_3$, ..., $218_N$ and does not apply weight thereon) and weight sensor 208 is referenced.

Referencing the sensors by detaching the patient from the weight sensors (i.e., either the sensor themselves, or elements connected to the sensors such as the weighing and reference segments), may be applied when the weight of the patient is measured, for example, with load-cells. To that end, at least one vertical separator is placed under the mattress. The vertical separator detaches the mattress from the load-cells such that no weight is applied on the load-cells. The load-cells are referenced and vertical separator returns the mattress again on the load-cells. The vertical separator may be one or more inflatable elements (e.g., a gas tube, an inflatable mattress), one or more hydraulic pistons, one or more pneumatic pistons one or more electric pistons and the like.

Figure 10A:
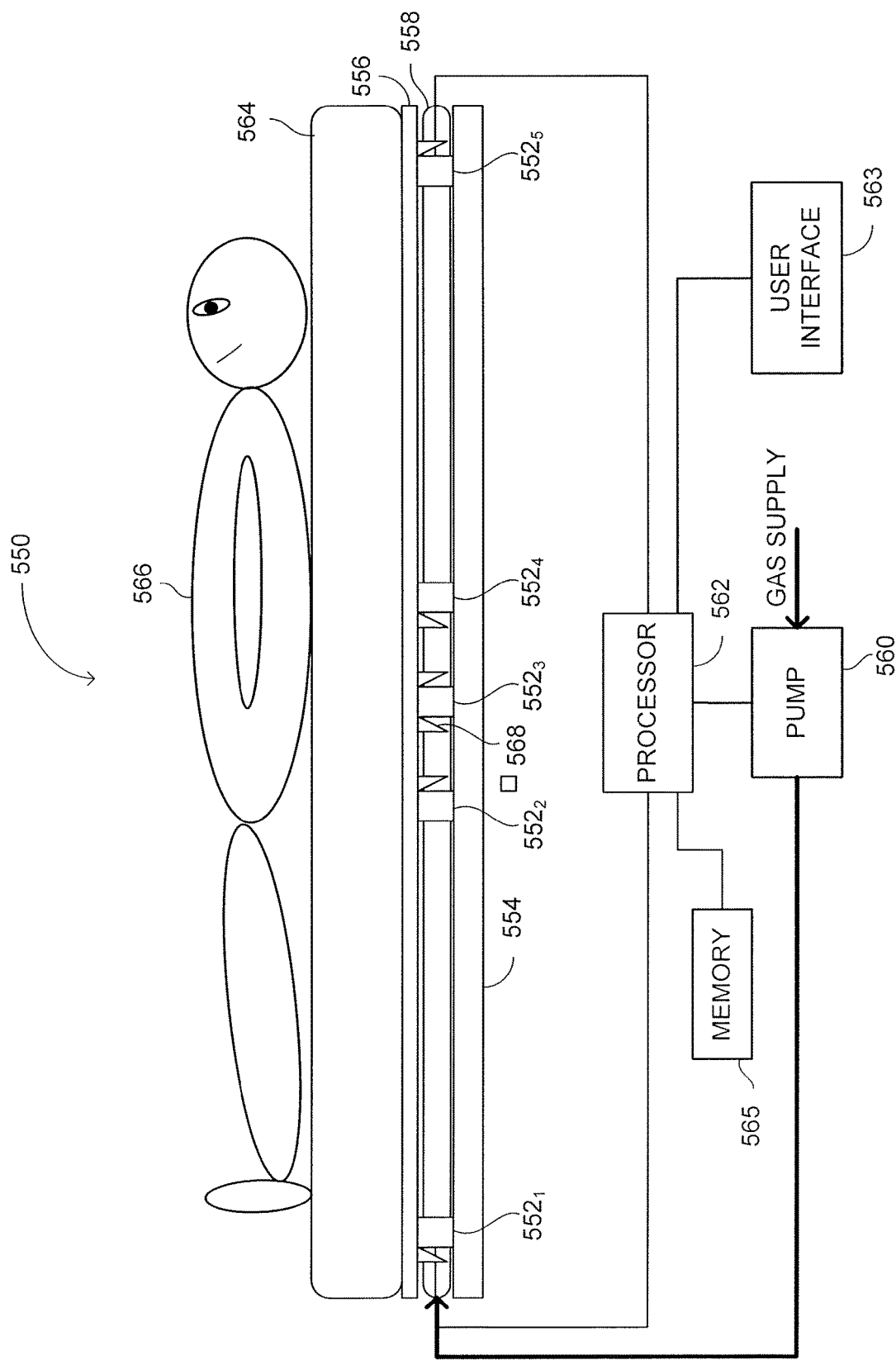
Figure 10B:
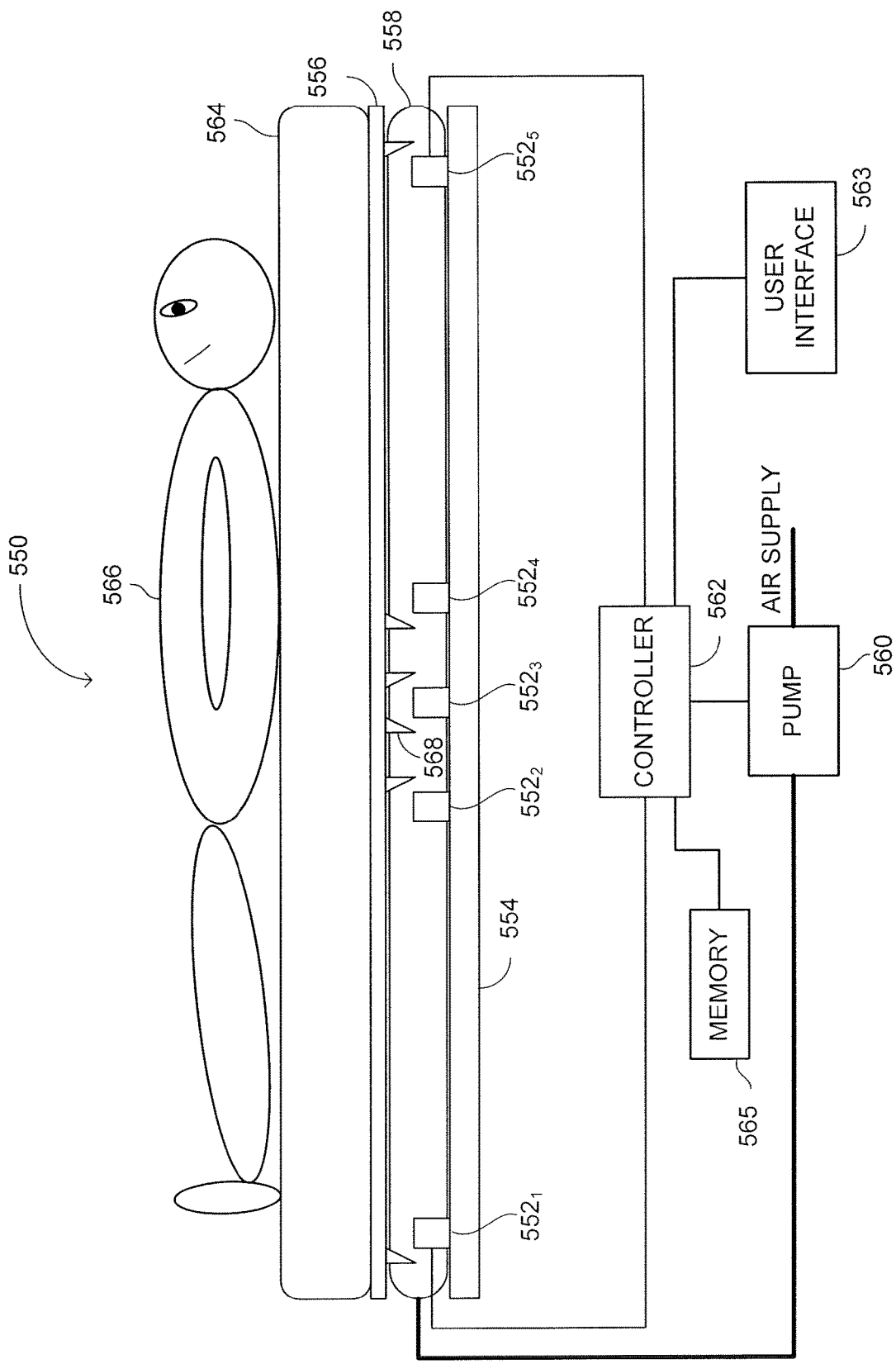
Figure 10C:
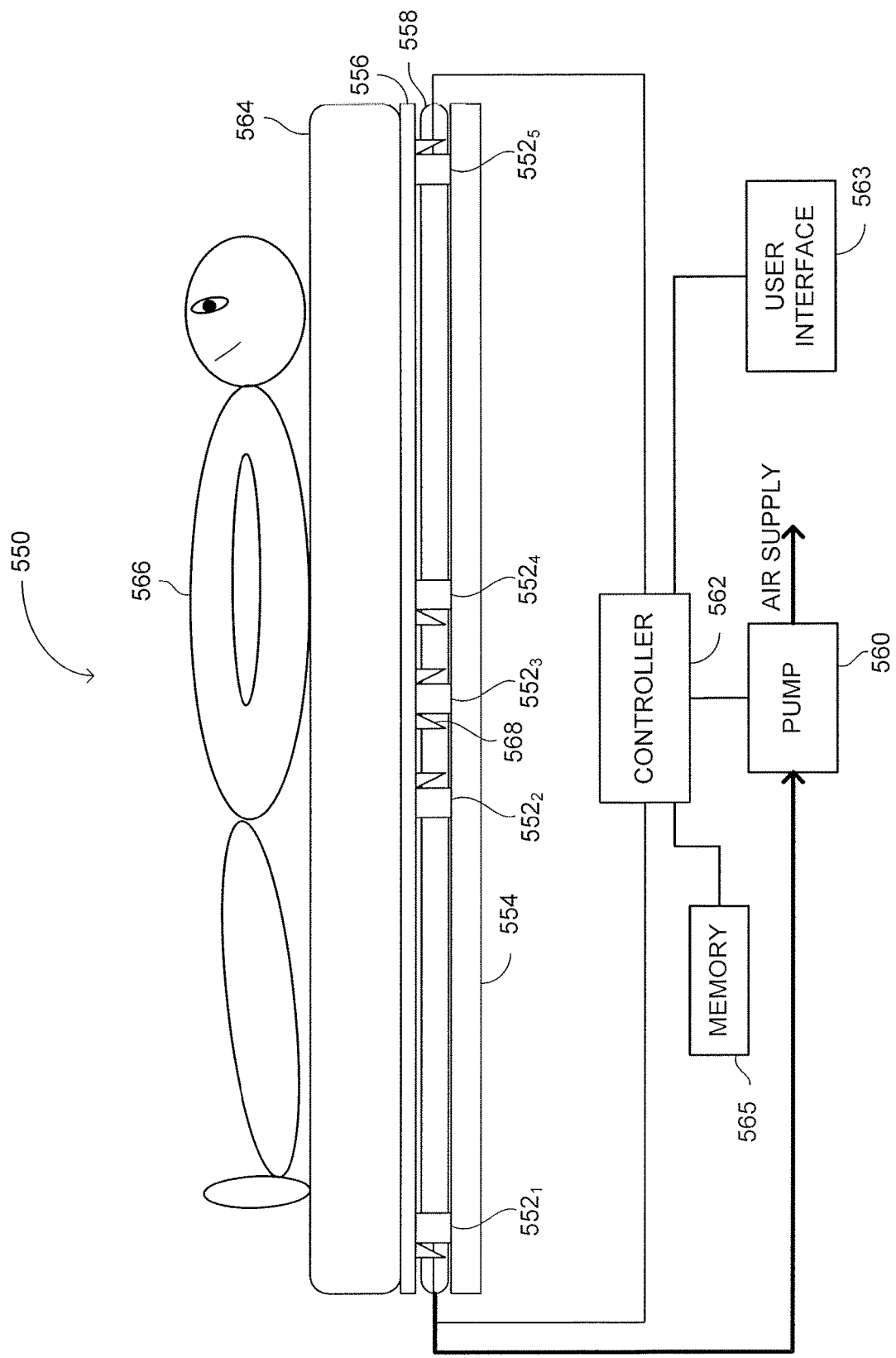

Reference is now made to FIGS. 10A, 10B and 100, which are schematic illustrations of a weight scales system, generally referenced 550, constructed and operative in accordance with another embodiment of the disclosed technique. In general, weight scale system 500 includes a bed section. The bed section includes a plurality of load-cells $552_1$, $552_2$, $552_3$, $552_4$, and $552_5$, a lower platform 554, an upper platform 556 and a vertical separator 558. In FIGS. 10A-10C, vertical separator is exemplified as an inflatable element. Weight scale system 500 further includes a pump 560, a controller 562, a user interface 563 and a memory 565. Load-cells $552_1$, $552_2$, $552_3$, $552_4$, and $552_5$ are positioned on lower platform 554 and optionally mechanically coupled thereto (e.g., either with glue, screws, or hoop-and-loop straps). Vertical separator 558 is placed on lower platform 554 but not on top of load-cells $552_1$, $552_2$, $552_3$, $552_4$, and $552_5$. Upper platform 556 is placed above load-cells $552_1$, $552_2$, $552_3$, $552_4$, and $552_5$. As a result, vertical separator 558 is positioned between lower platform 554 and upper platform 556. Upper platform 556 may further include aligning elements at the bottom side thereof, such as aligning element 568, for aligning upper platform 556 with load-cells $552_1$, $552_2$, $552_3$, $552_4$, and $552_5$, such that load-cells $552_1$, $552_2$, $552_3$, $552_4$, and $552_5$ are positioned at the corresponding positions thereof under upper platform 566. Aligning elements such as alignment element 568 may be embodied, for example, as alignment wedges. Also, upper platform 556 may be made of metal, wood, plastic or polycarbonate materials and may be embodied as a frame or a plate.

Pump 560 is coupled with controller 562 and fluidally coupled with inflatable element 558. Each one of load-cells $552_1$, $552_2$, $552_3$, $552_4$, and $552_5$ is coupled with controller 562. However, for the sake of clarity of FIGS. 10A-10C only load-cells $552_1$ and $552_5$ are depicted as coupled with controller 562. Controller 565 is further coupled with user interface 563 and with memory 565. A mattress 564 may be placed on top upper platform 556 and a patient 566 may lie down on top of mattress 564. Following is a description of the process of referencing load-cells $552_1$, $552_2$, $552_3$, $552_4$, and $552_5$.

With reference to FIG. 10A, load-cells $552_1$, $552_2$, $552_3$, $552_4$, and $552_5$ are to be referenced (i.e., associated with a referenced weight). To that end, controller 562 directs pump 560 to pump gas (e.g., air, carbon dioxide and the like) into vertical separator 558 from an gas supply (e.g., ambient air or a gas tank). Vertical separator 558 inflates and separates upper platform 556, along with mattress 564 and patient 566, from load-cells $552_1$, $552_2$, $552_3$, $552_4$, and $552_5$ (i.e., such that upper platform 556 does not come into contact with load-cells $552_1$, $552_2$, $552_3$, $552_4$, and $552_5$) and the weight associate with upper platform 556 (the tare weight and the weight of patient 566) is not applied on load-cells $552_1$, $552_2$, $552_3$, $552_4$, and $552_5$. In other words, vertical separator 558 detaches upper platform 556 and the load placed thereon from load-cells $552_1$, $552_2$, $552_3$, $552_4$, and $552_5$ such that the weight associated with upper platform 556 is not applied on load-cells $552_1$, $552_2$, $552_3$, $552_4$, and $552_5$.

With reference to FIG. 10B, vertical separator 558 has been inflated and upper platform 556, along with mattress 564 and patient 566 are detached from load-cells $552_1$, $552_2$, $552_3$, $552_4$, and $552_5$. Controller 562 acquires measurements from load-cells $552_1$, $552_2$, $552_3$, $552_4$, and $552_5$ and associated these measurements with a reference weigh, for example, the zero weight (i.e., referencing the load-cells).

With reference to FIG. 10C, after load-cells $552_1$, $552_2$, $552_3$, $552_4$, and $552_5$ have been referenced, controller 562 directs pump 560 to pump gas out of vertical separator 558 (i.e., deflate vertical separator 558) until upper platform 556 is lowered on top of load-cells $552_1$, $552_2$, $552_3$, $552_4$, and $552_5$, along with mattress 564 and patient 566, until upper platform 556 re-attaches load-cells $552_1$, $552_2$, $552_3$, $552_4$, and $552_5$ such that the weight associated with upper platform 556 fully applied on load-cells $552_1$, $552_2$, $552_3$, $552_4$, and $552_5$.

In general, controller 562 said directs pump 560 to operate the bed section, via vertical separator 558 in at least two modes, a referencing mode and a weighing mode. In the referencing mode, vertical separator 558 detaches upper platform 556 from load-cells $552_1$, $552_2$, $552_3$, $552_4$, and $552_5$, thereby enabling the referencing of load-cells $552_1$, $552_2$, $552_3$, $552_4$, and $552_5$. In the weighing mode, vertical separator 558 re-attaches upper platform 556 with load-cells $552_1$, $552_2$, $552_3$, $552_4$, and $552_5$, such the weight associated with upper platform 556 is fully applied on load-cells $552_1$, $552_2$, $552_3$, $552_4$, and $552_5$.

It is noted although five load-cells are depicted in FIGS. 10A-10C, the number of load-cells is not limited thereto and may larger or smaller according to design consideration. Also, although only a single vertical separator is referred to in FIGS. 10A and 10B, the number of vertical separators is not limited thereto and may larger according to design consideration. In general, each load-cell, each pair of load-cells or each group of four load-cells may be connected to a Wheatstone bridge. In other words, the load-cells may be connected to Wheatstone bridges in a quarter bridge, half bridge or full bridge configurations. The outputs of the Wheatstone bridges are sampled (e.g., with analog to digital converters) and summed (e.g., by controller 562). Controller 562 presents the weight of the patient 566 to a user via user interface 563.

When measuring the weight of a patient such as patient 566, the total weight of mattress 564 and upper platform 556, as well as of additional objects (e.g., pillows, blankets, sheets and the like), also referred to as tare weight, should be known. When measuring the weight of a patient, this tare weight is subtracted from the weight measured by the load-cells. The tare weight is determined when the patient is not located on the mattress. The load-cells are referenced similar to as described above, prior to measuring the tare weight. Alternatively, the weight of mattress 564, upper platform 556 and of other individual additional objects (e.g., the weight of each pillow, the weight of each blanket) may be measured prior to use and stored in memory 565. A user can indicated, via user interface 562 the number of blankets and pillows placed on the bed. Furthermore, if for example, the patient requests an additional blanket or an additional blanket, the user updates the tare weight by indicating, via user interface 563, that a blanket or a pillow has been added.

Figure 11A:
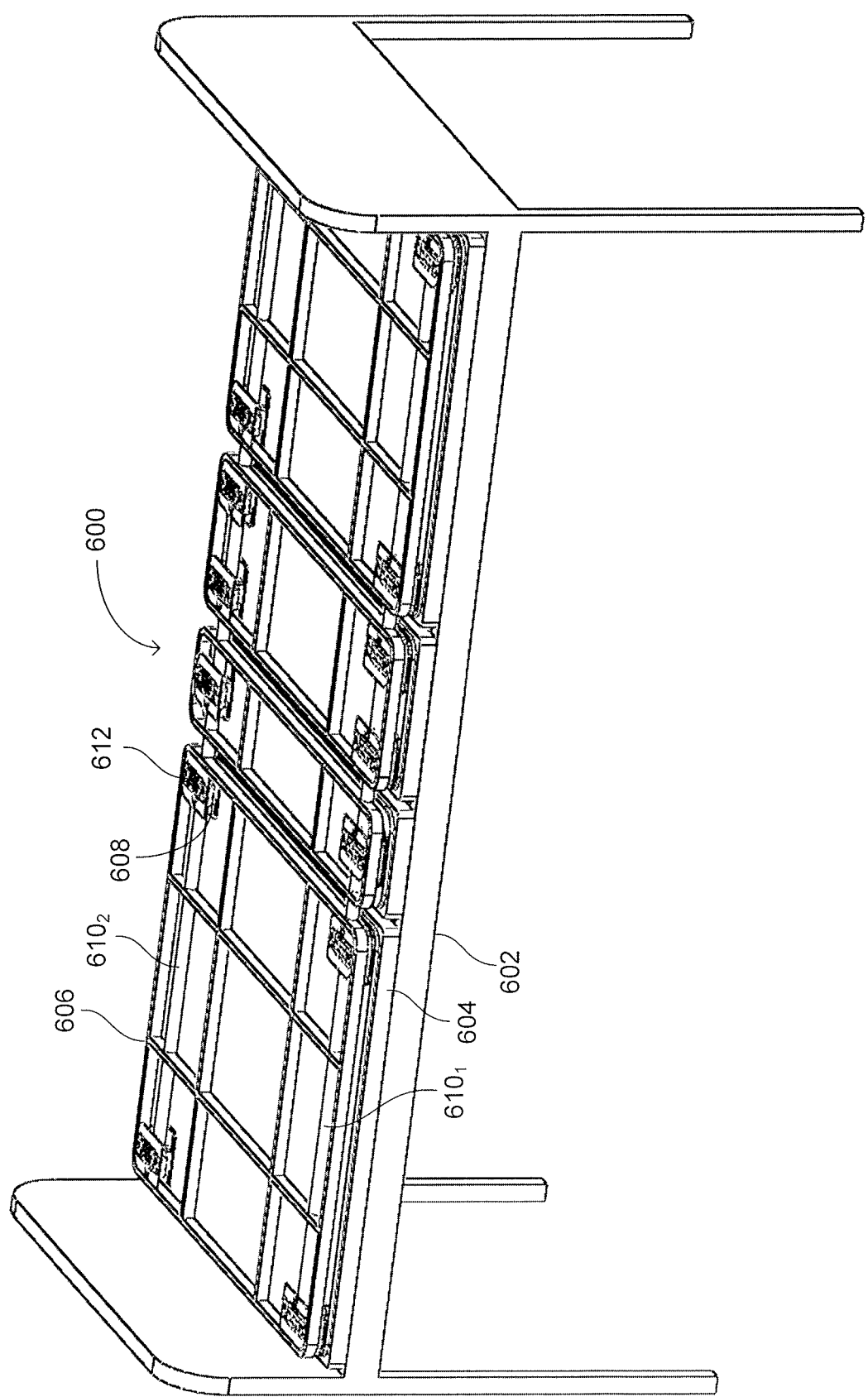
FIGS. 11A, 11B and 11C are schematic illustration of an exemplary bed section, constructed and operative in accordance with a further embodiment of the disclosed technique.
Figure 11B:
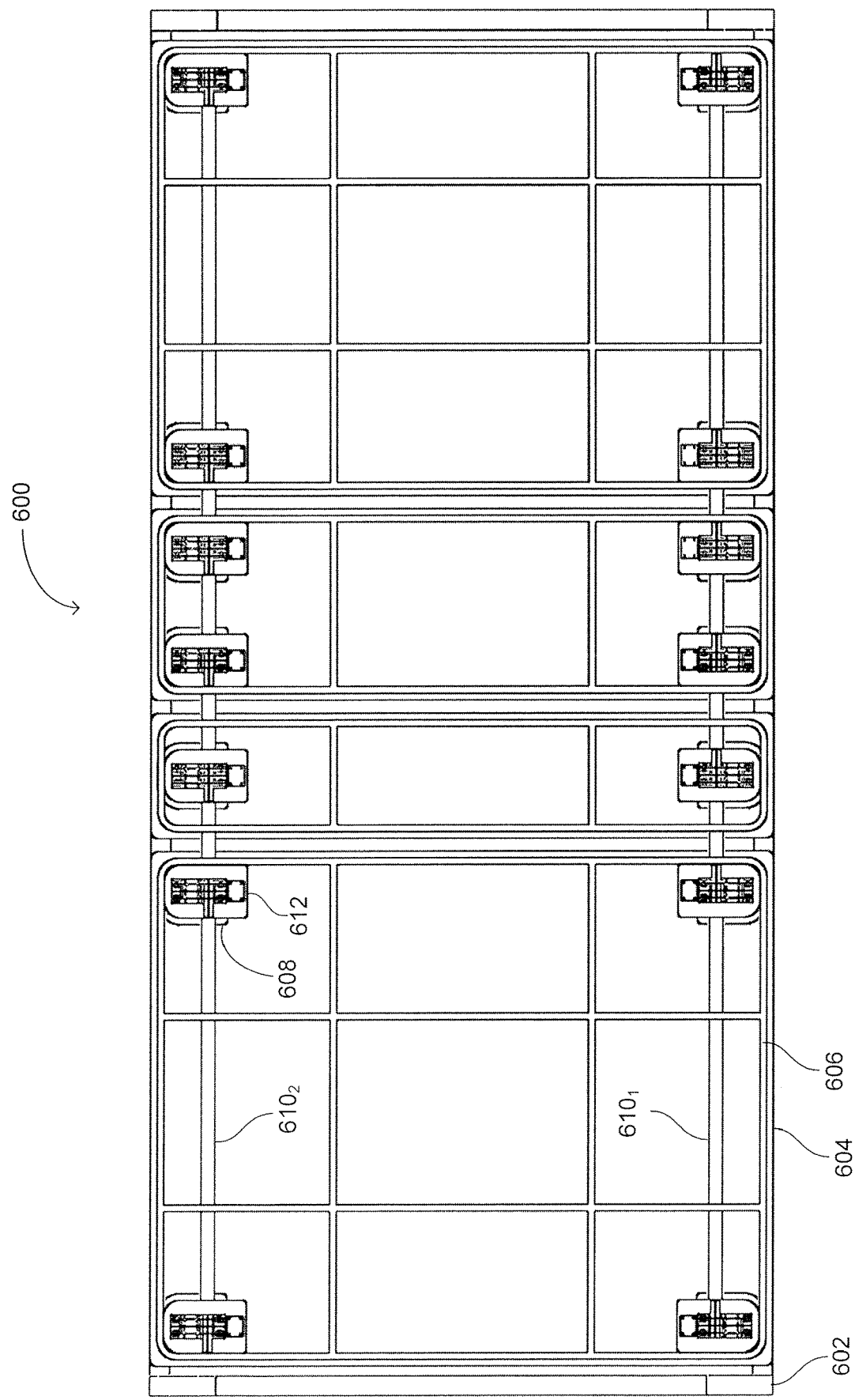
Figure 11C:
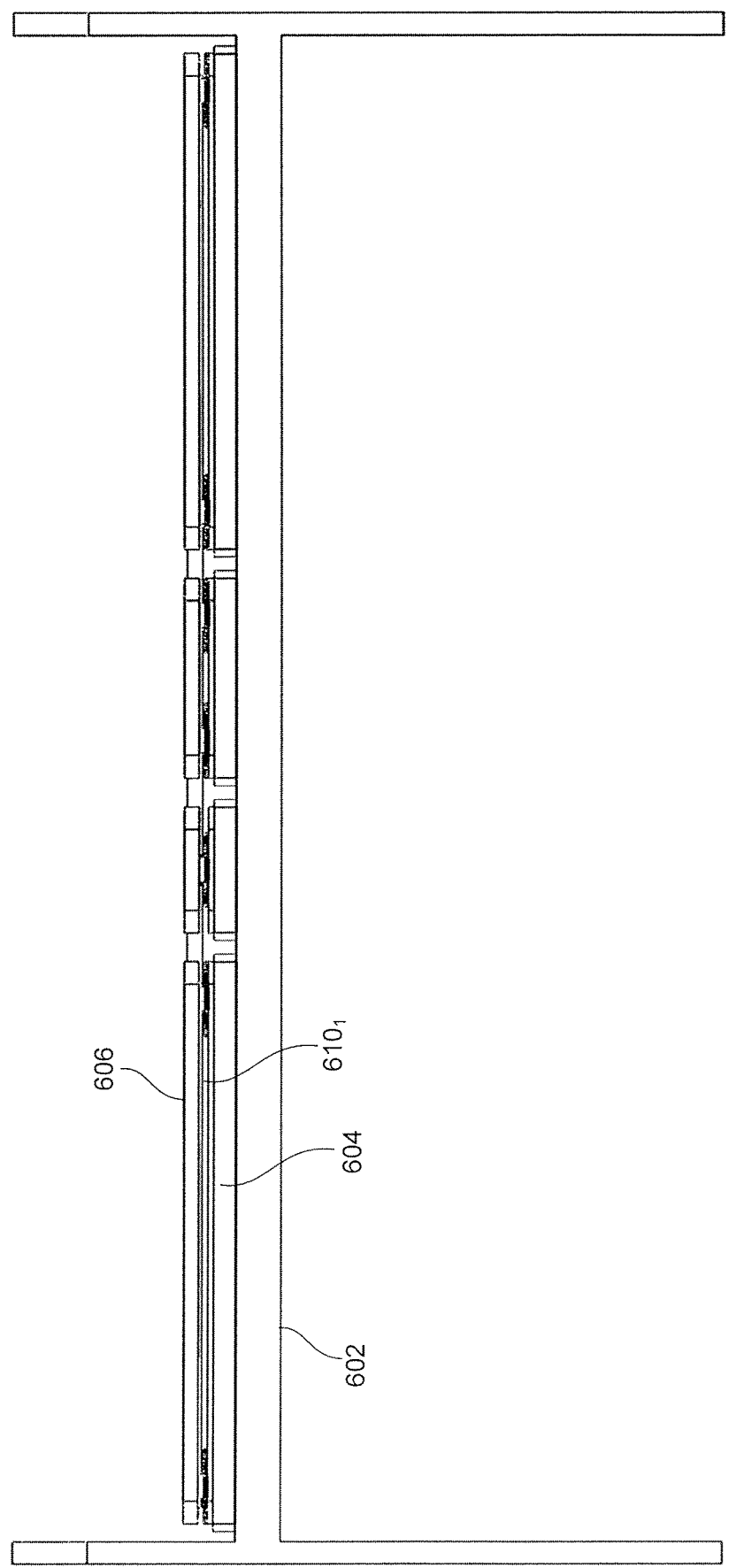

Following is an example of a bed section according to a further embodiment of the disclosed technique. Reference is now made to FIGS. 11A, 11B and 11C, which are schematic illustration of an exemplary bed section, general referenced 600, constructed and operative in accordance with a further embodiment of the disclosed technique. FIG. 11A depicts an isometric view of bed section 600, FIG. 11B depicts a top view of bed section 600 and FIG. 11C depicts a side view of bed section 600. Bed section 600 is located on a bed 602. Bed section 600 includes a lower platform 604, an upper platform 606, a plurality of load-cells such as load-cell 608 and two vertical separators $610_1$ and $610_2$. In the example brought forth in FIGS. 11A-11C, upper platform 606 is embodied as a frame and may include load-cells enclosures such as load-cell enclosure 612. Alternatively, lower platform 604 includes load-cells enclosures. Also in the example brought forth in FIGS. 11A-11C, each one of vertical separators $610_1$ and $610_2$ is embodied as a gas tube.

In general a weight scale system such as described above in conjunction with FIGS. 10A-10C and 11A-11C includes at least one vertical separator. When embodied as an inflatable element, the vertical separator may exhibit a selected form such as a straight line, the form of the letter 'S', the form of a figure '8', the form of the letter 'H' and the like. When a plurality of inflatable elements are employed, all the inflatable elements may be fluidally coupled with a single pump. Alternatively, each inflatable element may be fluidally coupled with a respective pump or each group of inflatable elements may be fluidally coupled with a respective pump. Also, the lower platform (e.g., lower platform 554—FIGS. 10A-10C or lower platform 604—FIGS. 11A-11C) and the upper platform (e.g., upper platform 556—FIGS. 11A-11C or upper platform 606—FIGS. 10A-10C) may be partitioned into corresponding sections, such that the lower platform and the upper platform are foldable.

Figure 12A:
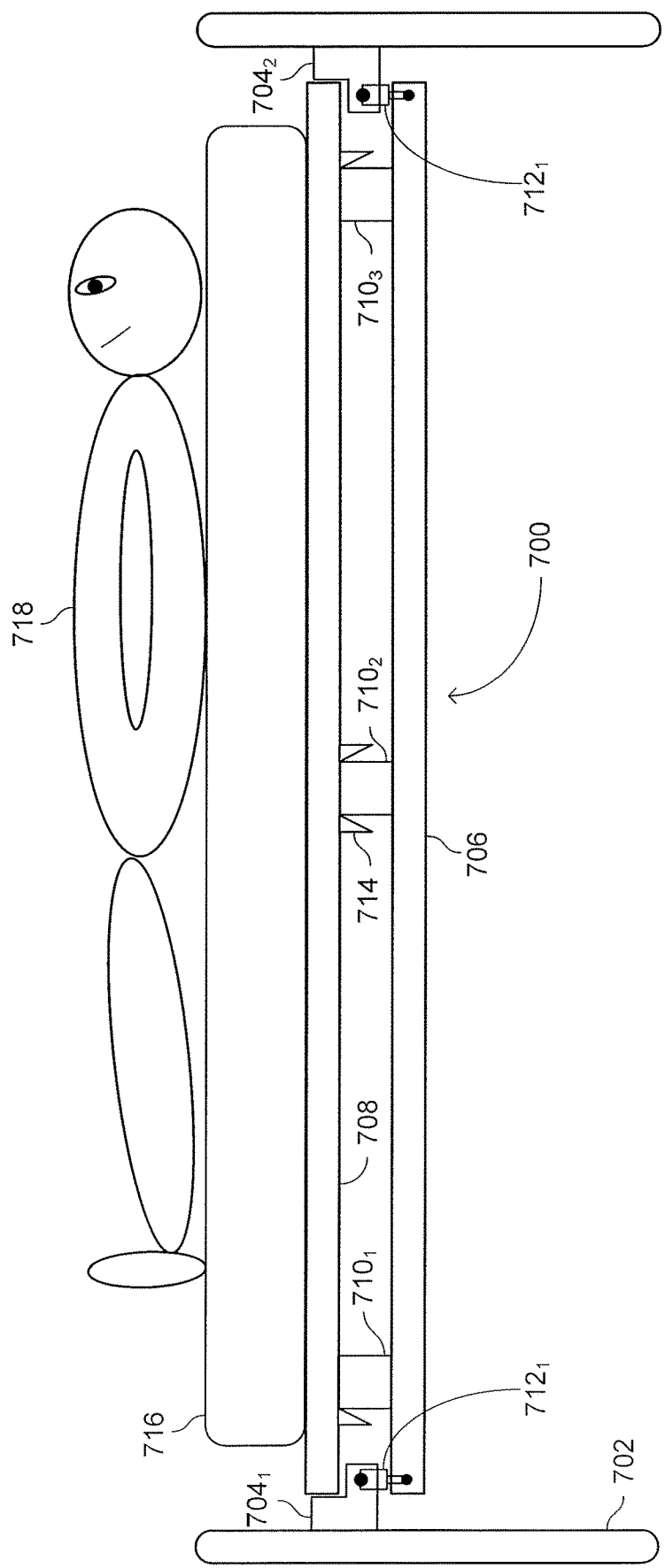
FIGS. 12A and 12B are a schematic illustration of an exemplary bed section, constructed and operative in accordance with another embodiment of the disclosed technique.
Figure 12B:
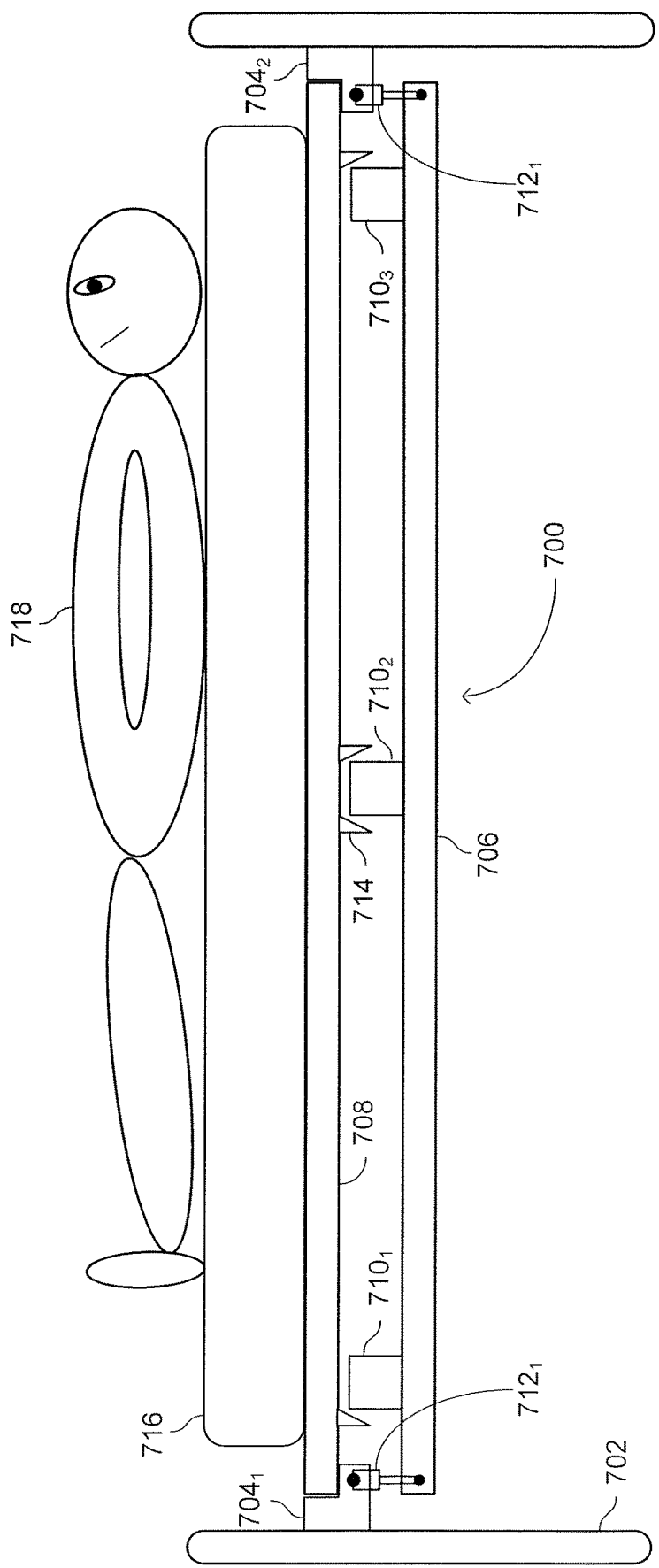

When detaching the upper platform from the load-cells, the upper platform may be raised above the load-cells or alternatively, the lower platform may be lowered. Reference is now made to FIGS. 12A and 12B, which are a schematic illustration of an exemplary bed section, generally referenced 700, constructed and operative in accordance with another embodiment of the disclosed technique. Bed section 700 is located on a bed 702. Bed 702 includes bed section supports $704_1$ and $704_2$. A mattress 716 is placed on top of upper platform 708 and a patient 718 may lies down on mattress 716. Bed section 700 includes a lower platform 706, an upper platform 708, a plurality of load-cells $710_1$, $710_2$ and $710_3$ and two vertical separators $712_1$ and $712_2$. Load-cells $710_1$, $710_2$ and $710_3$ are positioned on lower platform 706 and optionally mechanically coupled thereto. Upper platform 708 may include alignment elements such as alignment wedge 714. Vertical separators $712_1$ and $712_2$ are mechanically coupled with bed section supports $704_1$ and $704_2$ respectively.

With reference to FIG. 12A, upper platform 708 is supported by load-cells $710_1$, $710_2$ and $710_3$ such that upper platform 708, mattress 564, and patient 566 apply their full weight on load-cells $710_1$, $710_2$ and $710_3$. With reference to FIG. 12B, vertical separators lowered lower platform 706 along with load-cells $710_1$, $710_2$ and $710_3$ such that upper platform 708 and load-cells $710_1$, $710_2$ and $710_3$ are separated one from the other, upper platform 708 rests on bed section supports $704_1$ and $704_2$, and no weight is applied on load-cells $710_1$, $710_2$ and $710_3$. Thereafter, the load-cell can be referenced and the vertical separators $712_1$ and $712_2$ raise lower platform 706, long with load-cells $710_1$, $710_2$ and $710_3$ such that the upper platform 708 and the load placed thereon apply their full weight on load-cells $710_1$, $710_2$ and $710_3$.

Figure 13A:
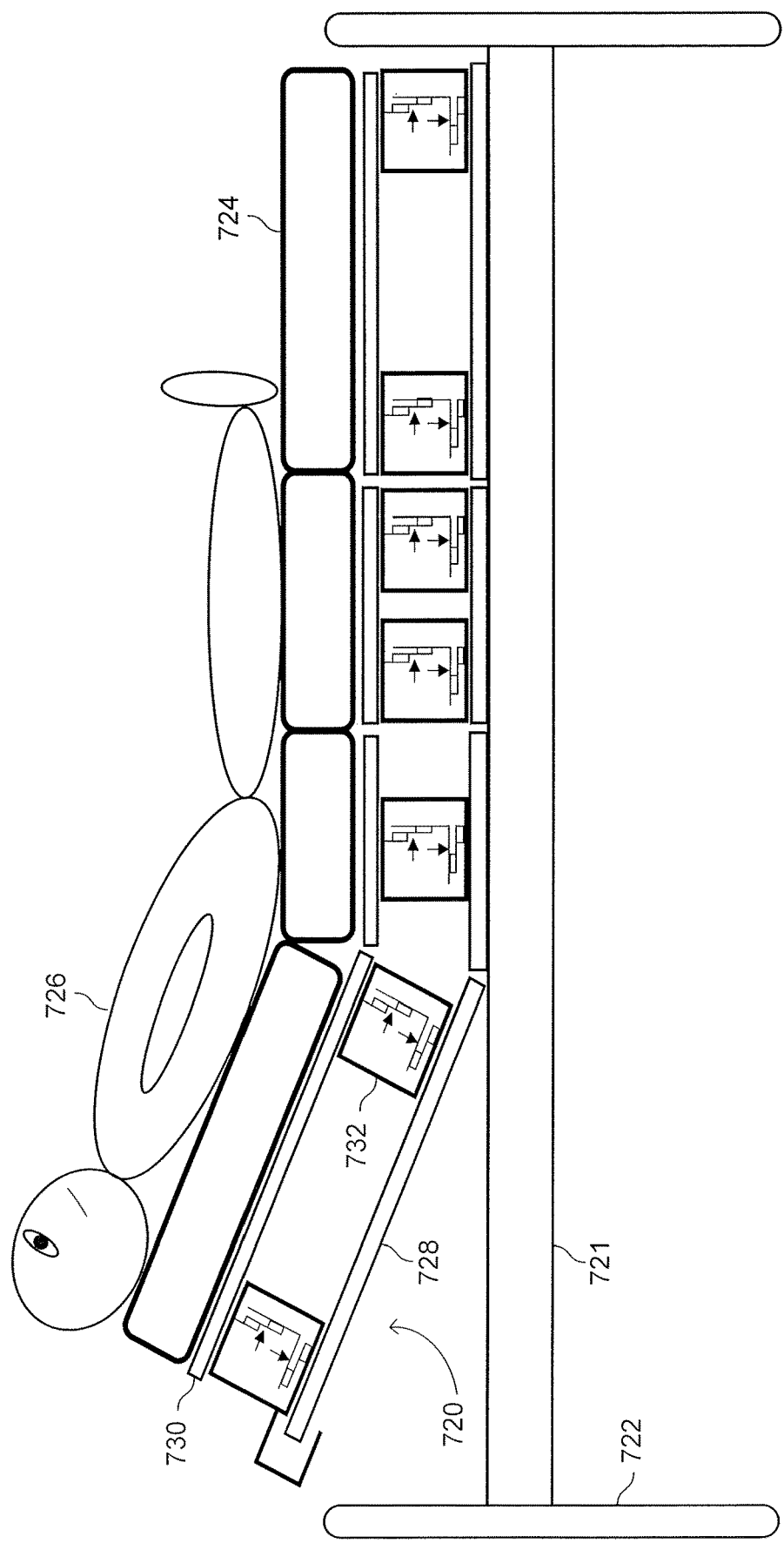
FIG. 13A is a schematic illustration of an exemplary bed section, constructed and operative in accordance with a further embodiment of the disclosed technique.

As mentioned above, lower platform and the upper platform of a bed section of a weight scale system according to the disclosed technique are partitioned into corresponding sections, such that the lower platform and the upper platform are foldable. When employed for measuring the weight of a patient in a hospital bed, this enables the bed section fold when one of the bed sections is inclined. Nevertheless, a weight scale system according to the disclosed technique can still determine the weight of the patient when one of the bed sections is inclined. Reference is now made to FIGS. 13A and 13B. FIG. 13A is a schematic illustration of an exemplary bed section, general referenced 720, constructed and operative in accordance with a further embodiment of the disclosed technique. FIG. 13B is a schematic illustration of an exemplary weight sensor assembly, general referenced 732, constructed and operative in accordance with a further embodiment of the disclosed technique.

Figure 14:
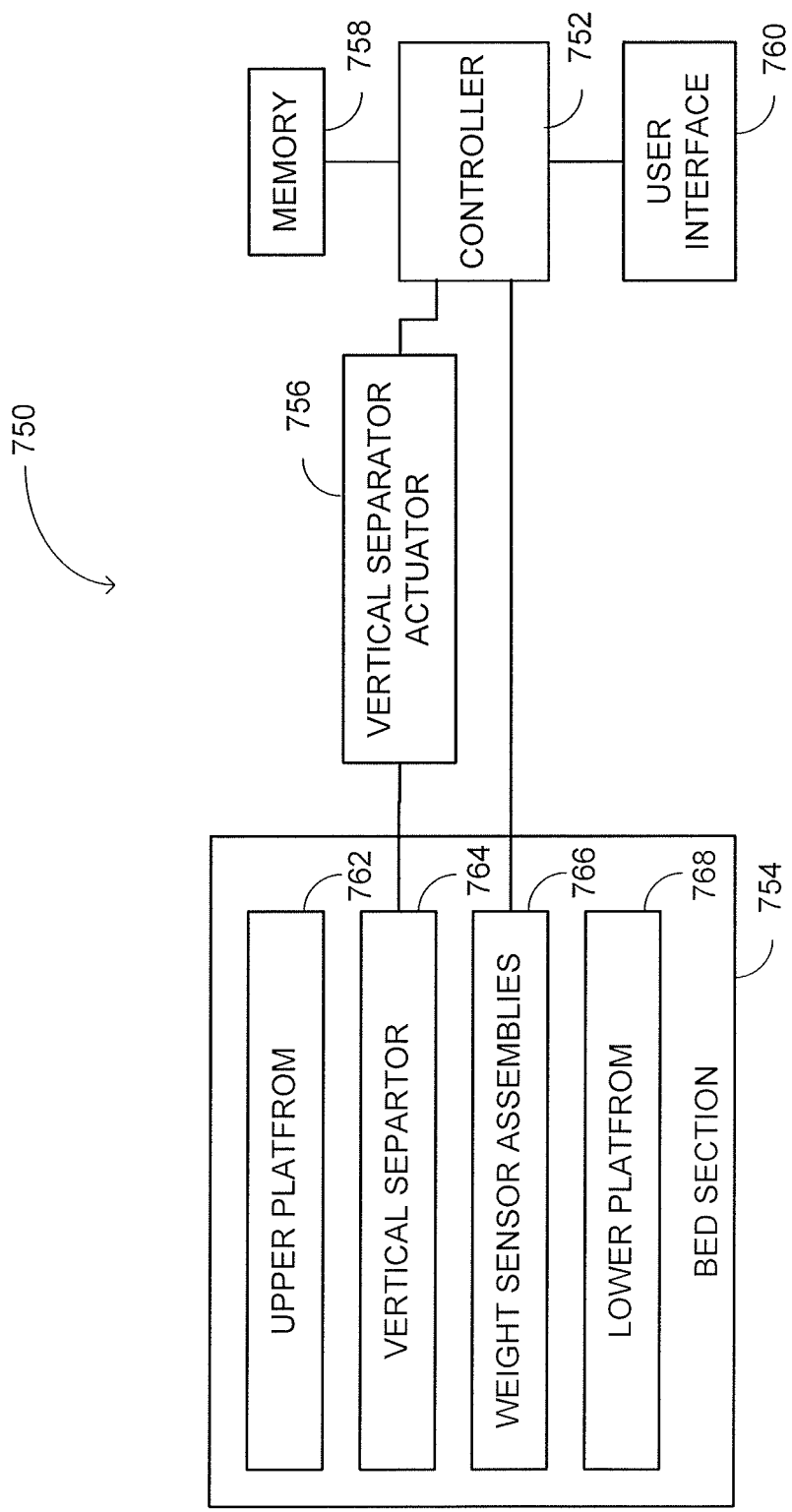
FIG. 14 is a schematic illustration of a weight scale system, constructed and operative in accordance with another embodiment of the disclosed technique.

With reference to FIG. 13A, bed section 720 is placed on a support 721 of bed 722. A mattress 724 is placed on top of bed section 720. A patient 724 may be lying down on mattress 722. Bed section 720 includes a lower platform 728, an upper platform 730, and a plurality of weight sensor assemblies such as weight sensor assembly 732. Bed section 720 further includes at least one vertical separator (not shown in FIG. 14 for the sake of clarity). In FIG. 14A, the segment of bed section 720 on which the upper body of patient 726 is located is inclined at an angle relative to support 721.

With reference to FIG. 13B, weight sensor assembly 732 includes two weight sensors, first weight sensor $734_1$ (also referred to as "horizontal sensor"), second weight sensor $734_2$ (also referred to as "vertical sensor") and an L-shaped bracket 736 (i.e., a bracket where the bracket plates are connected perpendicularly one with respect to the other). L-shaped bracket 736 includes two plates, first plate 737$_1$ and second plate 737$_2$. First plate 737$_1$ and second plate 737$_2$ are perpendicular one with respect to the other. FIG. 14B depicts a side view of L-shaped bracket 736. First weight sensor 734$_1$ is attached to lower frame 728 (i.e., either directly or in-directly via a sensors enclosure) and to the outer face of first plate 737$_1$, such that first weight sensor 734$_1$ measures any force applied perpendicular to first plate 737$_1$ (i.e., in the direction of arrow 820). Second weight sensor 734$_2$ is attached to the inner face of second plate 737$_2$, such that second weight sensor 734$_2$ measures any force applied perpendicular to second plate 737$_2$ (i.e., in the direction of arrow 822). L-shaped bracket 736 decomposes the force applied on the inclined segment of bed section 720 to the components thereof (i.e., the inclined segment of bed section 720).

Upper platform 730 is positioned on top of second weight sensor 734$_2$. The weight of patient 726, lying down on matters 724, applies a force in the direction of arrow 738 (i.e., perpendicular to support 721). First weight sensor 734$_1$ measures the component in the direction of arrow 820. Second weight sensor 734$_2$ measures the component in the direction of arrow 822. The magnitude of the vector sum (i.e., the root of the sum of the squares) of these two measurements is the magnitude of the force applied by patient 726 on sensor assembly 732. Sensor assemblies, such as weight sensor assembly 732 may also be connected to Wheatstone bridges in a quarter bridge, half bridge or full bridge configuration. When a plurality of sensor assemblies such as sensor assembly 732 are grouped (i.e., in groups of twos or fours), all the horizontal sensors in the group are connected to one Wheatstone bridge and all the vertical sensors are connected to another Wheatstone bridge. The output from each Wheatstone bridge is sampled and the magnitude of the vector sum of these outputs is determined.

Reference is now made to FIG. 14 which is a schematic illustration of a weight scale system, generally reference 750, constructed and operative in accordance with another embodiment of the disclosed technique. System 750 includes a controller 752, a bed section 754, a vertical separator actuator 756, a memory 758 and a user interface. Bed section 754 includes an upper platform 762, a vertical separator 764, weight sensor assemblies 766 and a lower platform 768. Bed section 754 may be any one of the bed sections described above in conjunction with FIGS. 10A-10C, 11A-11C and 12A-12B. Vertical separator may be an inflatable element (e.g., inflatable element 558—FIGS. 10A-10C) or inflatable elements (e.g., inflatable element 610$_1$ and 610$_2$—FIGS. 11A-11C), a hydraulic piston, a pneumatic piston, an electric piston, an electric scissors-jack and the like. Vertical separator actuator 756 corresponds to the type of vertical separator. For example, when vertical separator 764 is an inflatable element, vertical separator actuator 756 is a gas pump. When vertical separator 764 is a hydraulic piston or a pneumatic piston, vertical separator actuator 756 is a hydraulic or pneumatic pump respectively. When vertical separator 764 is an electric piston or an electric scissors-jack, vertical separator actuator 756 is an electric motor. Each of weight sensor assemblies 766 includes at least one weight sensors (e.g., load-cells 552$_1$, 552$_2$, 552$_3$, 552$_4$, and 552$_5$— FIGS. 10A-10C, sensor assembly 732—FIG. 13B or a combination thereof). Memory 758 stores calibration data, and may also store information relating to the weight of individual object typically placed on upper platform 762 (e.g., a mattress, a pillow, sheets, a blanket and the like). Memory 758 may further store past measurements of the object. User interface 760 presents data to the user. For example, user interface presents the user with the weight of the object. User interface 760 may receive information relating to objects placed on upper platform 762 thus enabling to update the tare weight placed on upper platform 762.

Controller 752 is coupled with vertical separator actuator 756, with the weight sensors in weight sensor assemblies 766, with memory 758 and with user interface 760. Vertical separator actuator 756 is further coupled with vertical separator 764. In operation upper platform 762 and the load placed thereon (i.e., the object to be measured and the tare weight) apply their full weight on weight sensor assemblies 766. Controller 752 acquires a measurement of the weight of the load applied on weight sensor assemblies 766 and subtracts the tare weight to determine the weight of the object (e.g., a patient in a hospital bed). When weight sensor assemblies 766 are employed for measuring the weight of an object positioned on an inclined surface, weight sensor assemblies include two weight sensors such as described above in conjunction with FIGS. 13A and 13B, controller 752 determines the vector sum of each two weight sensors in weight sensor assemblies 766.

When referencing the weight sensor, controller 752 directs vertical separator actuator 756 to operate vertical separator 764 so as to detach upper platform 762, and the load placed thereon, from weight sensor assemblies 766 such that no weight is applied on the weight sensors. A described above, when detaching upper platform 762 from weight sensor assemblies 766, vertical separator 764 may raise upper platform 762 or lower platform 768. When upper platform 762 is detached from weight sensor assemblies 766, controller 752 references the weight sensors in the weight sensor assemblies 766 (i.e., controller 752 associates the measurements from weight sensor assemblies 766 with a reference weight). Thereafter, controller 752 directs vertical separator actuator 756 to operate vertical separator 764 so as to re-attach upper platform 762 with weight sensors assemblies 766, such that the weight associated with upper platform 762 is fully applied on the weight sensor assemblies 766.

In general, controller 752 said vertical separator actuator 756 to operate bed section 754, via vertical separator 764 in at least two modes, a referencing mode and a weighing mode. In the referencing mode, vertical separator 764 detaches upper platform 761 from weight sensor assemblies 766, thereby enabling the referencing of the weight sensors. In the weighing mode, vertical separator 764 re-attaches upper platform 762 with weight sensor assemblies, such the weight associated with upper platform 762 (i.e., the tare weight and the weight of the object) is fully applied on weight sensors.

Similar to as described above, when measuring the weight of an object, controller 752 samples (e.g., with analog to digital converters) the measurements from the weight sensors or group of sensors (e.g., depending on the configuration of the Wheatstone bridges) and sums these measurements. When sensor assemblies 766 are similar to sensor assemblies 732 (FIGS. 13A and 13B), controller 752 determines the magnitude of the vector sum of the measurements from horizontal sensors and the vertical sensor as described above in conjunction with FIGS. 13A and 13B). Controller 752 presents the weight of the object to a user via user interface 760. Controller 752 may further be connected to a network, thereby transmitting the measured weight to a remote location. For example, when measuring the weight of a patient in a hospital bed, controller 752 transmits (e.g., via a network adapter) the weight to the nurse station. Alternative, controller 752 transmits the weight to a portable device (e.g., a smartphone, a tablet computer and the like). Furthermore, when weight scale system 700 is employed to measure the weight of patient in a hospital bed, controller 752 may detect that the patient has left the bed (e.g., when the measured weight decreases at least at a predetermined rate and drops below a threshold value for a predetermined time-period). Controller 752 may than generate an alarm, for example, via user interface 760 or via the network. Also when weight scale system 700 is employed to measure the weight of patient in a hospital bed, weight scale system 700 may be employed to measure the liquid balance of a patient by entering (e.g., via user interface 760) the weight of the liquids administered to the patient, and weighing the patient with and without the waste collection bag. The difference between the weight of the patient with and without the waste collection bag results in the weight of the waste. The difference between the weight of the liquids administered to the patient and the weight of the waste is indicative of the patient liquid balance.

Figure 15:
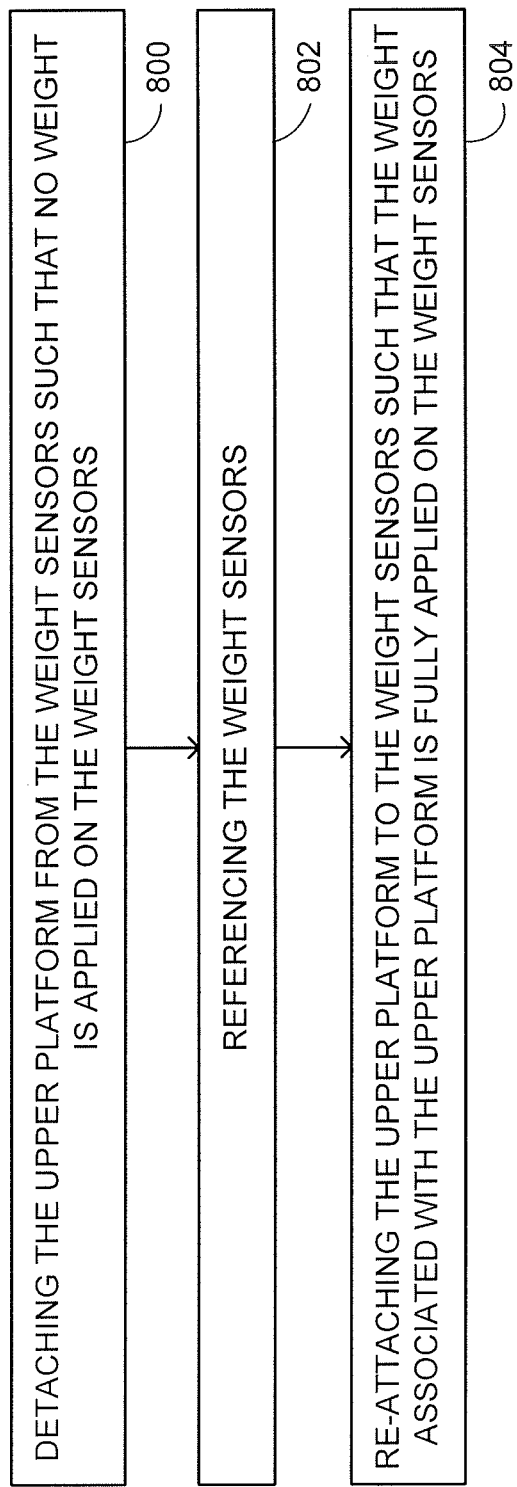
FIG. 15 is a schematic illustration of a method for referencing weight sensors in a bed section, operative in accordance with a further embodiment of the disclosed technique.

Reference is now made to FIG. 15, which is a schematic illustration of a method for referencing weight sensors in a bed section, operative in accordance with a further embodiment of the disclosed technique. In procedure 800, the weight sensors are detached from the upper platform of the bed section such that no load is applied on the weight sensors. According to one alternative, the upper platform is raised above the weight sensors by a vertical separator. According to another alternative, the lower platform is lowered by the vertical separator. With reference to 13, controller 752 directs vertical separator actuator 756 to operate vertical separator 764 so as to detach upper platform 762, and the load placed thereon from weight sensor assemblies 766.

In procedure 802, the weight sensors are referenced. When referencing the weight sensors, the measurement from the weight sensors is associated with a reference weight (e.g., the zero weight). With reference to FIG. 13, controller 752 references the weight sensor in weight sensor assemblies 766.

In procedures 804, the upper platform is re-attached with the weight sensors such that the weight associated with the upper platform (e.g., the weight of the platform, the patient and of additional objects placed on the upper platform) is fully applied on the weight sensors (i.e., either lower upper platform or raise lower platform). With reference to FIG. 13, controller 752 directs controller 752 directs vertical separator actuator 756 to operate vertical separator 764 so as to re-attach upper platform 762 with weight sensors 766 such that upper platform 762 and the load placed thereon apply their full weight on weight sensors 766.

It will be appreciated by persons skilled in the art that the disclosed technique is not limited to what has been particularly shown and described hereinabove. Rather the scope of the disclosed technique is defined only by the claims, which follow.

The invention claimed is:

1. A weight scale system for measuring weight of one or more objects, the weight scale system comprising:
a bed section including:
a lower platform partitioned into foldable sections;
an upper platform, for bearing the weight of said one or more objects, said upper platform partitioned into foldable sections;
a plurality of weight sensor assemblies, a portion of said weight sensor assemblies including two or more load cells and the remaining ones of said weight sensor assemblies including at least one load cell, said plurality of weight sensor assemblies located on said lower platform, said two or more load cells in each of said portion of said weight sensor assemblies arranged perpendicular one with respect to the other, each load cell operable to measure weight applied thereon;
at least one vertical separator, operable to detach said upper platform from said plurality of weight sensor assemblies;
at least one vertical separator actuator, coupled with said vertical separator, operable to operate said vertical separator; and
a controller, coupled with said plurality of weight sensor assemblies and with said vertical separator actuator, said controller directing said vertical separator actuator to operate said bed section in two or more modes:
a referencing mode in which said vertical separator detaches said upper platform from said plurality of weight sensor assemblies, thereby enabling referencing of said load cells; and
a weighing mode, in which said vertical separator re-attaches said upper platform with said plurality of weight sensor assemblies, such that the weight associated with said upper platform is fully applied on said weight sensor assemblies.

2. The weight scale system according to claim 1, wherein said vertical separator comprises at least one inflatable element and said vertical separator actuator comprises at least one gas pump, fluidly coupled with said inflatable element.

3. The weight scale system according to claim 2, wherein said vertical separator includes two or more air tubes.

4. The weight scale system according to claim 2, wherein said upper platform includes alignment elements at a bottom side of said upper platform, for aligning said upper platform with said at least one load cell, wherein said at least one load cell is positioned at a corresponding position of said at least one load cell under said upper platform.

5. The weight scale system according to claim 1, wherein said vertical separator raises said upper platform to detach said upper platform from said weight sensor assemblies.

6. The weight scale system according to claim 1, wherein said vertical separator lowers said lower platform to detach said upper platform from said weight sensor assemblies.

7. The weight scale system according to claim 1, wherein said bed section is positioned on a hospital bed, for measuring the weight of a patient lying on said hospital bed; and
wherein said vertical separator detaches said upper platform from said weight sensor assemblies when said patient is lying on said hospital bed.

8. The weight scale system according to claim 1, wherein each of said portion of said weight sensor assemblies further includes an L-shaped bracket, said L-shaped bracket includes two plates perpendicular one with respect to the other, a first load cell of said two or more load cells is attached to said lower frame and to an outer face of a first plate, such that said first load cell measures force applied perpendicular to said first plate, a second load cell of said two or more load cells is attached to an inner face of the second plate, wherein said second load cell measures force applied perpendicular to said second plate, and
wherein the weight of the object is applied on each of said load cells.

9. The weight scale system according to claim 1, wherein each of said weight sensor assemblies includes a sensor enclosure.

10. A method for referencing weight sensor assemblies in a weight scale system, each weight sensor assembly including two or more load cells arranged perpendicular one with respect to the other, the method comprising:
- detaching an upper platform of a bed section of a weight scale from said weight sensor assemblies such that no weight is applied on said load cells, said bed section including a lower platform, said upper platform being configured for bearing the weight of one or more objects, said weight sensor assemblies located on said lower platform and operable to measure weight applied thereon;
- referencing each of said load cells; and
- re-attaching said upper platform to said weight sensor assemblies such that full weight of said upper platform and the load thereon apply on each of said load cells.

11. The method according to claim 10, wherein said upper platform is lifted above each of said load cells.

12. The method according to claim 10, wherein said lower platform is lowered to detach said upper platform from each of said load cells.

13. The method according to claim 10, wherein said bed section is positioned on a hospital bed, for measuring weight of a patient lying on said hospital bed; and
- wherein said detaching occurs when said patient is lying on said hospital bed.

* * * * *